(12) United States Patent
Weng et al.

(10) Patent No.: US 11,630,283 B2
(45) Date of Patent: Apr. 18, 2023

(54) OPTICAL IMAGING LENS

(71) Applicant: ZHEJIANG SUNNY OPTICAL CO., LTD, Zhejiang (CN)

(72) Inventors: Xiaofeng Weng, Zhejiang (CN); Mengna Tang, Zhejiang (CN); Jianke Wenren, Zhejiang (CN); Fujian Dai, Zhejiang (CN); Liefeng Zhao, Zhejiang (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 236 days.

(21) Appl. No.: 17/037,792

(22) Filed: Sep. 30, 2020

(65) Prior Publication Data

US 2021/0255424 A1    Aug. 19, 2021

(30) Foreign Application Priority Data

Feb. 14, 2020    (CN) .......................... 202010092812.9

(51) Int. Cl.
| | | |
|---|---|---|
| *G02B 9/62* | (2006.01) | |
| *G02B 3/04* | (2006.01) | |
| *G02B 7/02* | (2021.01) | |
| *G02B 13/00* | (2006.01) | |
| *G02B 3/02* | (2006.01) | |

(Continued)

(52) U.S. Cl.
CPC ................. *G02B 9/62* (2013.01); *G02B 3/04* (2013.01); *G02B 3/02* (2013.01); *G02B 5/005* (2013.01); *G02B 7/021* (2013.01); *G02B 13/0045* (2013.01); *G02B 13/02* (2013.01); *G02B 13/04* (2013.01); *G02B 13/18* (2013.01); *G02B 27/0025* (2013.01)

(58) Field of Classification Search
CPC ...... G02B 9/62; G02B 13/18; G02B 13/0045; G02B 13/04; G02B 3/04; G02B 3/02; G02B 27/0025; G02B 7/021; G02B 5/005; G02B 13/02
USPC ................ 359/713, 739, 740, 752, 756, 757
See application file for complete search history.

(56) References Cited

U.S. PATENT DOCUMENTS 9,354,427 B2 *  5/2016  Hashimoto .............. G02B 9/62
9,798,108 B2 * 10/2017  Chen .................. G02B 13/0045
(Continued)

FOREIGN PATENT DOCUMENTS

CN    109613683 A  *  4/2019  ......... G02B 13/0045
CN    110346897 A  * 10/2019  ......... G02B 13/0045
(Continued)

*Primary Examiner* — Evelyn A Lester
(74) *Attorney, Agent, or Firm* — Gang Yu

(57) ABSTRACT

An optical imaging lens is provided. The optical imaging lens includes sequentially from an object side to an image side along an optical axis: a first lens with a positive refractive power; a second lens with a negative refractive power; a third lens with a refractive power, an object side surface of the third lens being a convex surface, an image side surface of the third lens being a concave surface; a fourth lens with refractive power, an object side surface of the fourth lens being a convex surface, an image side surface of the fourth lens being a concave surface a fifth lens with a negative refractive power, an object side surface of the fifth lens being a convex surface, an image side surface of the fifth lens being a concave surface; and a sixth lens with a refractive power.

20 Claims, 35 Drawing Sheets

(51) Int. Cl.
    *G02B 5/00*         (2006.01)
    *G02B 13/04*       (2006.01)
    *G02B 27/00*       (2006.01)
    *G02B 13/02*       (2006.01)
    *G02B 13/18*       (2006.01)

(56) References Cited

U.S. PATENT DOCUMENTS

| | | | |
|---|---|---|---|
| 10,025,067 B2 * | 7/2018 | Chen | G02B 13/0045 |
| 10,338,350 B2 * | 7/2019 | Hashimoto | G02B 13/0045 |
| 10,459,200 B2 * | 10/2019 | Hsieh | G02B 13/0045 |
| 10,976,526 B2 * | 4/2021 | Hsieh | G02B 9/64 |
| 11,169,360 B2 * | 11/2021 | Zhang | G02B 9/60 |
| 11,269,161 B2 * | 3/2022 | Huh | G02B 13/0045 |
| 11,275,231 B2 * | 3/2022 | Sekine | G02B 9/62 |
| 2016/0216479 A1 * | 7/2016 | Chen | G02B 13/0045 |
| 2016/0216480 A1 * | 7/2016 | Chen | G02B 13/0045 |
| 2016/0266356 A1 * | 9/2016 | Hashimoto | G02B 5/208 |
| 2018/0224634 A1 * | 8/2018 | Hashimoto | G02B 9/62 |
| 2019/0219795 A1 * | 7/2019 | Chen | G02B 9/62 |
| 2020/0249445 A1 * | 8/2020 | Hu | G02B 13/06 |
| 2020/0292785 A1 * | 9/2020 | Sekine | G02B 9/62 |
| 2022/0334360 A1 * | 10/2022 | Huang | G02B 5/208 |
| 2022/0334361 A1 * | 10/2022 | Chen | G02B 13/0045 |

FOREIGN PATENT DOCUMENTS

| | | | | |
|---|---|---|---|---|
| CN | 110515186 A | * | 11/2019 | G02B 13/18 |
| EP | WO 2020134093 A1 | * | 7/2020 | G02B 13/0045 |

\* cited by examiner

OPTICAL IMAGING LENS

CROSS-REFERENCE TO RELATED APPLICATIONS

The present disclosure claims priority to Chinese Patent Application No. 20200100928129, submitted to the State Intellectual Property Office (SIPO) on Feb. 14, 2020, the contents of which are hereby incorporated by reference in their entirety.

TECHNICAL FIELD

The disclosure relates to the field of optical elements and, more particularly, to an optical imaging lens.

BACKGROUND

In recent years, with the rapid update of smart electronic devices such as mobile phones, computers, tablet PC(s) and other products, the market has a gradually increased demand for camera functions suitable for portable electronic products, as well as even higher demands. An image sensor of a charge-coupled device (CCD) type or a complementary metal oxide semiconductor (CMOS) type is usually provided in the camera module, and an optical imaging lens is provided. The optical imaging lens can collect light on the object side, the imaging light travels along the light path of the optical imaging lens and irradiates the image sensor, and then the image sensor converts optical signals into electric signals to form image data.

There are many kinds of optical imaging lenses, such as medium and long focus lens, wide angle lens and large aperture lens. The long-focus lens is mainly used for shooting a close-up lens, a compression lens and a shallow depth-of-field lens, and the large-aperture lens enables the lens to have sufficient luminous flux so as to ensure that the image surface has high illumination intensity. In order to achieve a richer photographing effect, an existing mobile phone is provided with a plurality of lenses in combination, such as a combination of a long-focus lens and a large-aperture lens. A camera module that combines a plurality of lenses generally takes up more space.

Under the premise of ensuring excellent imaging quality, an optical imaging lens capable of realizing long-focus characteristics and with large aperture characteristics is necessary.

SUMMARY

The disclosure provides an optical imaging lens, which sequentially from an object side to an image side along an optical axis includes: a first lens with a positive refractive power; a second lens with a negative refractive power; a third lens with a refractive power, an object side surface of the third lens is a convex surface, and an image side surface of the third lens is a concave surface; a fourth lens with a refractive power, an object side surface of the fourth lens is a convex surface, an image side surface of the fourth lens is a concave surface; a fifth lens with a negative refractive power, an object side surface of the fifth lens is a convex surface, an image side surface of the fifth lens is a concave surface; a sixth lens with a refractive power, a distance on the optical axis between the object side surface of the first lens to an imaging surface of an optical imaging lens is a Total Track Length (TTL), the TTL and a total effective focal length f of the optical imaging lens satisfy: $TTL/f<1.0$; a radius of curvature R5 of the object side surface of the third lens, the radius of curvature R6 of the image side surface of the third lens and a center thickness CT3 of the third lens on the optical axis satisfy: $1.5<(R5+R6)(10\times CT3)<5.5$.

In some embodiments, the object side of the first lens to an image side of the sixth lens has at least one aspherical mirror surface.

In some embodiments, an effective focal length f1 of the first lens, an effective focal length f5 of the fifth lens, and an effective focal length f2 of the second lens satisfy: $1.2<f1/(f5-f2)<2.3$.

In some embodiments, the radius of curvature R6 of the image side surface of the third lens and the radius of curvature R5 of the object side surface of the third lens satisfy: $0.4<R6/R5<1.5$.

In some embodiments, a radius of curvature R8 of the image side surface of the fourth lens and a radius of curvature R7 of the object side surface of the fourth lens satisfy: $0.6<R8/R7<1.2$.

In some embodiments, an effective focal length f5 of the fifth lens, a radius of curvature R9 of the object side surface of the fifth lens, and a radius of curvature R10 of the image side surface of the fifth lens satisfy: $-1.0<f5/(R9+R10)<-0.2$.

In some embodiments, a spacing distance T23 on the optical axis between the second lens and the third lens, and a spacing distance T34 on the optical axis between the third lens and the fourth lens, a spacing distance T45 on the optical axis between the fourth lens and the fifth lens and a spacing distance T56 on the optical axis between the fifth lens and the sixth lens satisfy: $0.8<(T23+T34)/(T45+T56)<1.4$.

In some embodiments, an effective half-aperture DT62 of an image side surface of the sixth lens, an effective half-aperture DT31 of the object side surface of the third lens, and an effective half-aperture DT32 of the image side surface of the third lens satisfy: $0.8<DT62/(DT31+DT32)<1.2$.

In some embodiments, a combined focal length f12 of the first lens and the second lens and a combined focal length f56 of the fifth lens and the sixth lens satisfy: $-1.0<f12/f56<-0.6$.

In some embodiments, SAG51 and SAG41 satisfy: $2.2<SAG51/SAG41<2.9$, the SAG51 is an on-axis distance from an intersection point of the object side surface of the fifth lens and the optical axis to an effective radius vertex of the object side surface of the fifth lens, the SAG41 is an on-axis distance from an intersection point of the object side surface of the fourth lens and the optical axis to an effective radius vertex of the object side surface of the fourth lens.

In some embodiments, an edge thickness ET2 of the second lens and a center thickness CT2 of the second lens on the optical axis satisfy: $0.9<ET2/CT2<0.7$.

In some embodiments, an edge thickness ET5 of the fifth lens and a center thickness CT6 of the sixth lens on the optical axis satisfy: $0.5<ET5/CT6<1.2$.

The disclosure also provides an optical imaging lens which sequentially from an object side to an image side along an optical axis includes: a first lens with a positive refractive power; a second lens with a negative refractive power; a second lens with a negative refractive power; a third lens with a refractive power, an object side surface of the third lens is a convex surface, an image side surface of the third lens is a concave surface; a fourth lens with a refractive power, an object side surface of the fourth lens is a convex surface, an image side surface of the fourth lens is a concave surface; a fifth lens with a negative refractive power, an object side surface of the fifth lens is a convex surface, an image side surface of the fifth lens is a concave surface; a sixth lens with a refractive power; a distance on the optical axis between the object side surface of the first lens to an imaging surface of an optical imaging lens is a Total Track Length (TTL), the TTL and a total effective focal length f of the optical imaging lens satisfy: TTL/f<1.0; a combined focal length f12 of the first lens and the second lens and a combined focal length f56 of the fifth lens and the sixth lens satisfy: −1.0<f12/f56<−0.6.

BRIEF DESCRIPTION OF THE DRAWINGS

Other features, objects, and advantages of the disclosure will become apparent from the following detailed description of non-limiting embodiments, taken in conjunction with the accompanying drawings. In the drawings.

DETAILED DESCRIPTION OF THE EMBODIMENTS

Figure 1:
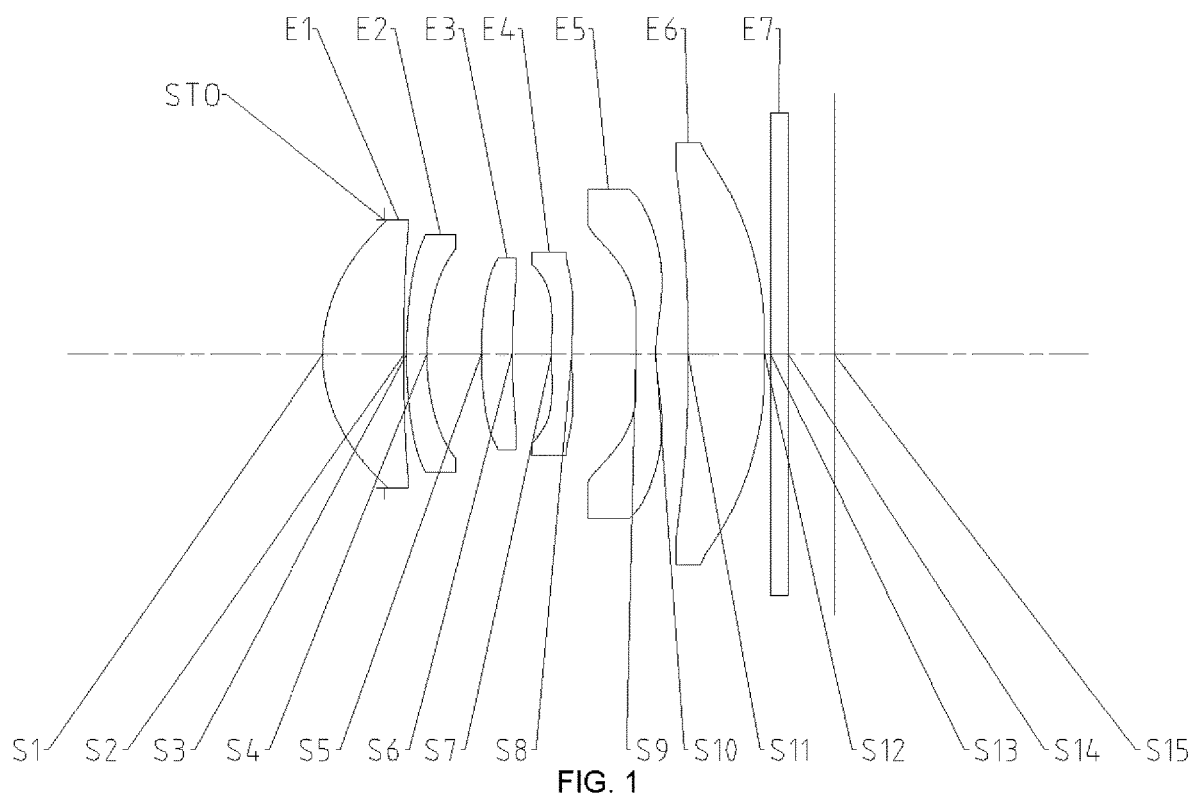
FIG. 1 is a schematic view showing a structure of an optical imaging lens according to Embodiment 1 of the disclosure.

For a better understanding of the disclosure, various aspects of the disclosure will be described in more detail with reference to the accompanying drawings. It is to be understood that these detailed descriptions are merely illustrative of exemplary embodiments of the disclosure and are not intended to limit the scope of the disclosure in any way. Like reference numerals refer to like elements throughout. The expression "and/or" includes any and all combinations of one or more of the associated listed items.

It should be noted that in this specification, the expressions "first", "second", "third", etc. are used solely to distinguish one feature from another and do not denote any limitation of a feature. Thus, the first lens discussed below may also be referred to as a second lens or a third lens without departing from the teachings of the disclosure.

In the drawings, the thickness, size and shape of the lens have been slightly exaggerated for ease of illustration. In particular, the spherical or aspherical shape shown in the drawings is illustrated by way of Embodiment. That is, the spherical or aspherical shape is not limited to the spherical or aspherical shape shown in the drawings. The drawings are merely exemplary and are not strictly to scale.

In this context, a paraxial region refers to a region near the optical axis. If the lens surface is convex and the position of the convex surface is not defined, then it means that the lens surface is convex at least in the paraxial region; and if the lens surface is concave and the concave position is not defined, then it means that the lens surface is concave at least in the paraxial region. The surface of each lens closest to the object to be photographed is called an object side of the lens, and the surface of each lens closest to the imaging surface is called the image side of the lens.

It should also be understood that the terms "include", "including", "having", comprise and/or "comprising", when used in this specification, mean that the stated features, elements and/or components are present, but does not exclude the presence or addition of one or more other features, elements, components and/or a combination thereof. In addition, when expressions such as "at least one of . . . " appear after the list of listed features, it modifies the entire listed features and does not modify an individual element in the list. In addition, when describing the embodiments of the disclosure, the use of "may" means "one or more embodiments of the disclosure". Also, the expression "exemplary" is intended to refer to an Embodiment or illustration.

Unless otherwise defined, all terms (including technical and scientific terms) used herein have the same meaning as commonly understood by one of ordinary skill in the art to which the disclosure belongs. It will also be understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in this disclosure and the features in the embodiments can be combined with each other if there is no conflict. Hereinafter, the disclosure will be described in detail with reference to the drawings and in conjunction with embodiments.

The features, principles, and other aspects of the disclosure are described in detail below.

An optical imaging lens according to some embodiments of the disclosure includes six lenses with refractive powers, that is, a first lens, a second lens, a third lens, a fourth lens, a fifth lens and a sixth lens. The six lenses are provided in sequence from an object side to an image side along an optical axis. At least one of the first lens to the sixth lens has an aspherical mirror surface. In the first lens to the sixth lens, there is an air space between any two adjacent lenses.

In some embodiments, the first lens has a positive refractive power; the second lens has a negative refractive power; the third lens has a positive refractive power or a negative refractive power, an object side surface of the third lens is a convex surface, and an image side surface of the third lens is a concave surface; the fourth lens has a positive refractive power or a negative refractive power, an object side surface of the fourth lens is a convex surface, and an image side surface of the fourth lens is a concave surface; the fifth lens has a negative refractive power, an object side surface of the fifth lens is a convex surface, and an image side surface of the fifth lens is a concave surface; the sixth lens has a positive refractive power or a negative refractive power. Through reasonable distribution of positive and negative refractive powers of the first lens and the second lens in the optical imaging lens, spherical aberration and chromatic aberration of the optical imaging lens can be effectively balanced, so that the optical imaging lens has better imaging quality and process ability; by reasonably distributing the surface shapes of the third lens, the fourth lens and the fifth lens, spherical aberration and astigmatism generated by the three lenses can be effectively balanced, and imaging quality of the optical imaging lens is improved. In addition, the deflection path of the imaging light can be ensured.

In some embodiments, the optical imaging lens according to the disclosure satisfies. TTL/f<1.0, wherein the TTL is a distance on the optical axis between the object side of the first lens to an imaging surface and f is an total effective focal length of the optical imaging lens. Satisfaction of TTL/f<1.0 is favorable for realizing the long-focus characteristic of the optical imaging lens. More specifically, the TTL satisfies 0.94<TTL/f<1.0.

In some embodiments, the optical imaging lens according to the disclosure satisfies: 1.5<(R5+R6)/(10*CT3)<5.5, wherein R5 is an radius of curvature of the object side of the third lens, R6 is an radius of curvature of the image side of the third lens, and CTS is a center thickness of the third lens on the optical axis. More specifically, R5, R6 and CT3 further satisfy: 1.6<(R5+R6)/(10*CT3)<2.6. By controlling the ratio of the radius of curvature to the center thickness of the mirror surface of the third lens, the optical sensitivity of the third lens is reduced, and the range of the field curvature contribution of the third lens can be controlled, so that the imaging quality of the optical imaging lens is improved.

In some embodiments, the optical imaging lens according to the disclosure satisfies: 1.2<f1/(f5−f2)<2.3, wherein f1 is an effective focal length of the first lens, f5 is an effective focal length of the fifth lens, and f2 is an effective focal length of the second lens. By satisfying 1.2<f1/(f5−f2)<2.3, the spherical aberration contribution of these lenses can be effectively controlled within a certain range, which is favorable for obtaining good imaging quality in the on-axis field of view.

In some embodiments, the optical imaging lens according to the disclosure satisfies: 0.4<R6/R5<1.5, wherein R6 is the radius of curvature of the image side of the third lens and R5 is the radius of curvature of the object side of the third lens. More specifically, R5 and R6 further satisfy: 0.4<R/R5≤1.4. By controlling the ratio of the radius of curvatures of the two mirror surfaces of the third lens, the deflection angle of the imaging light after passing through the third lens can be effectively controlled, so that the sensitivity of the optical imaging lens is effectively reduced, and the field curvature contribution of the third lens is in a reasonable range.

In some embodiments, the optical imaging tens according to the disclosure satisfies: 0.6<R8/R7<1.2, wherein R8 is an radius of curvature of the image side of the fourth lens and R7 is an radius of curvature of the object side of the fourth lens. By controlling the ratio of the radius of curvatures of the two mirror surfaces of the fourth lens, the curvature of the fourth lens is favorably controlled, so that the optical sensitivity of the fourth lens is effectively reduced, good processing performance is guaranteed, and the Chief Ray Angle (CRA) of the photosensitive chip is better matched when light of each field of view of the optical imaging lens reach the imaging surface.

In some embodiments, the optical imaging lens according to the disclosure satisfies: −1.0<f5/(R9+R10)<−0.2, wherein f5 is the effective focal length of the fifth lens, R9 is a radius of curvature of the object side of the fifth lens, and R10 is a radius of curvature of the image side of the fifth lens. The curvature of the fifth lens can be controlled by satisfying −1.0<f5/(R9+R10)<−0.2, so that the field curvature contribution of the fifth lens can be controlled, the optical sensitivity of the fifth lens can be effectively reduced, and better manufacturability can be obtained.

In some embodiments, the optical imaging lens according to the disclosure satisfies: 0.8<(T23+T34)/(T45+T56)<1.4, wherein T23 is a spacing distance on the optical axis between the second lens and the third lens, T34 is a spacing distance on the optical axis between the third lens and the fourth lens, and T45 is a spacing distance on the optical axis between the fourth lens and the fifth lens, T56 is a spacing distance on the optical axis between the fifth lens and the sixth lens. By satisfying 0.8<(T23+T34)/(T45+T56)<1.4, the space ratio of the second lens to the sixth lens can be well controlled, so that the assembly process of the lens can be favorably ensured, and the miniaturization of the optical imaging lens can be favorably realized.

In some embodiments, the optical imaging lens according to the disclosure satisfies: 0.8<DT62/(DT31+DT32)<1.2, wherein DT62 is an effective half aperture of an image side of the sixth lens. DT31 is an effective half aperture of an object side of the third lens, and DT32 is an effective half aperture of an image side of the third lens. More specifically. DT62, DT31, and DT32 further satisfy: 0.9≤DT62/(DT31+DT32)<1.2. By controlling the effective semi-calibers of the two mirror surfaces of the third lens and the effective semi-calibers of the image side surfaces of the sixth lens to be matched, on one hand, the over-large caliber difference between the third lens and the sixth lens can be avoided, and the assembly stability is ensured; on the other hand, the range of incident light is favorably limited, so that light with poor edge quality are eliminated, the off-axis aberration can be reduced, and the resolving power of the optical imaging lens is effectively improved. In addition, the aperture of the optical imaging lens can be ensured.

In some embodiments, the optical imaging lens according to the disclosure satisfies −1.0<f12/f56<−0.6, wherein f12 is a combined focal length of the first lens and the second lens and f56 is a combined focal length of the fifth lens and the sixth lens. Satisfying of −1.0<f12/f56<−0.6 can distribute the focal length of each lens well, so that the sensitivity of the optical imaging lens is reduced, the requirement of too strict tolerance is avoided, the spherical aberration contribution of the lenses can be controlled, and the imaging quality of the optical imaging lens is good.

In some embodiments, the optical imaging lens according to the disclosure satisfies: 2.2<SAG51/SAG41<2.9, wherein SAG51 is an on-axis distance between an intersection of the fifth lens object side and the optical axis to a vertex of the effective radius of the fifth lens object side, and SAG41 is an on-axis distance between an intersection of the fourth lens object side and the optical axis to a vertex of the effective radius of the fourth lens object side. By satisfying 2:2<SAG51/SAG41<2.9, the field curvature, on-axis spherical aberration and chromatic spherical aberration of the optical imaging lens can be easily balanced, so that good imaging quality and low lens sensitivity are obtained, and the process ability of the optical imaging lens is better guaranteed.

In some embodiments, the optical imaging lens according to the disclosure satisfies: 0.9<ET2/CT2<1.7, wherein ET2 is an edge thickness of the second lens and CT2 is a center thickness of the second lens on the optical axis. By satisfying 0.9<ET2/CT2<1.7, the processing, molding, assembling and other performances of the second lens are favorably guaranteed, so that the optical imaging lens obtains good imaging quality, and the front end of the optical imaging lens is guaranteed to have a smaller size.

In some embodiments, the optical imaging lens according to the disclosure satisfies: 0.5<ET5/CT6<1.2, wherein ET5 is an edge thickness of the fifth lens and CT6 is a center thickness of the sixth lens on the optical axis. Satisfying of 0.5<ET5/CT6<1.2 is beneficial to ensure the processing, molding and assembling performance of the optical imaging lens so as to obtain good imaging quality of the optical imaging lens. However, the unreasonable ratio may lead to some problems, such as difficult adjustment of molded lens surface, easy deformation and obvious deformation after lens assembly, and the imaging quality of optical imaging lens can not be ensured.

In some embodiments, the optical imaging lens further includes a diaphragm. The diaphragm is arranged in place as desired, for example, between the object side and the first lens. Alternatively, the optical imaging lens further includes at least one of the following: a filter for correcting a color deviation, a protective glass for protecting a photosensitive element located on the imaging surface.

The optical imaging lens according to the above-mentioned embodiments of the disclosure includes a plurality of lenses, e.g. six lenses as above. By reasonably distributing the refractive power of each lens, the surface shape of each lens, the center thickness of each lens, the axial distance between two lenses and the like, the size of the imaging lens is effectively reduced, the sensitivity of the imaging lens is reduced, the process ability of the imaging lens is improved, the optical imaging lens is more beneficial to production and processing, and the optical imaging lens is applicable to portable electronic products. Meanwhile, the optical imaging lens provided by the disclosure also has excellent optical properties such as long focus characteristic, large aperture, good imaging quality and the like.

In some embodiments of the disclosure, at least one of the mirrors of each lens is an aspheric mirror, that is, at least one of the object side of the first lens to the image side of the sixth lens is an aspheric mirror surface. The aspherical lens is characterized in that: the curvature varies continuously from the center of the lens to the periphery of the lens. Unlike a spherical lens with a constant curvature from the center of the lens to the periphery of the lens, an aspherical lens has better radius of curvature characteristics, and has the advantages of improving distortion and improving astigmatic aberration. By adopting the aspheric lens, the aberration occurring during imaging can be eliminated as much as possible, thereby improving the imaging quality. Optionally, at least one of the object side and the image side of each of lenses which includes the first lens, the second lens, the third lens, the fourth lens, the fifth lens, and the sixth lens is an aspherical mirror surface. Alternatively, the object side and the image side of each of lenses which includes the first lens, the second lens, the third lens, the fourth lens, the fifth lens and the sixth lens are aspheric mirrors.

However, a person skilled in the art should understand that without departing from the technical solution described in this disclosure, the number of lenses constituting the optical imaging lens can be changed to obtain the various results and advantages described in this specification. For example, although six lenses are described as embodiments, the optical imaging lens is not limited to including six lenses. The optical imaging lens may also include other numbers of lenses, if desired. Specific embodiments of the optical imaging lens applicable to the above-mentioned embodiments are further described below with reference to the accompanying drawings.

Embodiment 1

An optical imaging lens according to Embodiment 1 of the disclosure is described below with reference to FIGS. 1 to 2D. FIG. 1 is a schematic view showing a structure of an optical imaging lens according to Embodiment 1 of the disclosure.

As shown in FIG. 1, the optical imaging lens includes sequentially from an object side to an image side along an optical axis: a diaphragm STO, a first lens E1, a second lens E2, a third lens E3, a fourth lens E4, a fifth lens E5, a sixth lens E6, and an optical filter E7.

The first lens E1 has a positive refractive power, an object side surface S1 of the first lens is a convex surface and an image side surface S2 of the first lens is a convex surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third lens is a concave surface. The fourth lens E4 has a negative refractive power, an object side surface S7 of the fourth lens is a convex surface and an image side surface S8 of the fourth lens is a concave surface. The fifth lens E5 has a negative refractive power, an object side surface S9 of the fifth lens is a convex surface and an image side surface S1 of the fifth lens is a concave surface. The sixth lens E6 has a positive refractive power, an object side surface S11 of the sixth lens is a convex surface and an image side surface S12 of the sixth lens is a convex surface. The filter E7 has an object side S13 and an image side S14. The optical imaging lens has an imaging surface S15 through, light from an object passes through S1 to S14 sequentially and is finally imaged at the imaging surface S15.

Table 1 shows a basic parameter table of the optical imaging lens of Embodiment 1, and the units of radius of curvature, thickness/distance, and focal length are millimeters (mm).

TABLE 1

| | | | | Materials | | | |
|---|---|---|---|---|---|---|---|
| Surface number | Surface type | Radius of curvature | Thickness/ Distance | Refractive Index | Abbe number | Focal length | Conic coefficient |
| OBJ | Spherical | Infinity | Infinity | | | | |
| STO | Spherical | Infinity | −0.7200 | | | | |

TABLE 1-continued

| Surface number | Surface type | Radius of curvature | Thickness/ Distance | Materials | | Focal length | Conic coefficient |
| | | | | Refractive Index | Abbe number | | |
| --- | --- | --- | --- | --- | --- | --- | --- |
| S1 | Aspheric | 1.8661 | 0.9567 | 1.55 | 56.1 | 3.38 | 0.0000 |
| S2 | Aspheric | −123.0590 | 0.0300 | | | | 0.0000 |
| S3 | Aspheric | 6.2850 | 0.2385 | 1.68 | 19.2 | −7.11 | 0.0000 |
| S4 | Aspheric | 2.6855 | 0.6426 | | | | 0.0000 |
| S5 | Aspheric | 4.3493 | 0.3602 | 1.54 | 55.7 | 56.31 | −0.2716 |
| S6 | Aspheric | 4.3325 | 0.4661 | | | | 0.0000 |
| S7 | Aspheric | 7.3183 | 0.2385 | 1.67 | 20.4 | −24.79 | 0.0000 |
| S8 | Aspheric | 5.0001 | 0.7640 | | | | 0.0000 |
| S9 | Aspheric | 5.2479 | 0.2320 | 1.54 | 55.7 | −4.84 | 0.0000 |
| S10 | Aspheric | 3.7108 | 0.3833 | | | | −1.0000 |
| S11 | Aspheric | 44.4608 | 0.8982 | 1.68 | 19.2 | 23.39 | 0.0000 |
| S12 | Aspheric | −24.4295 | 0.0693 | | | | 0.0000 |
| S13 | Spherical | Infinity | 0.2100 | 1.52 | 64.2 | | |
| S14 | Spherical | Infinity | 0.5407 | | | | |
| S15 | Spherical | Infinity | | | | | |

In this embodiment, the value of a total effective focal length f of the optical imaging lens is 6.65 mm, value of TTL which is a distance on the optical axis between the object side S1 of the first lens E1 to the imaging surface S15 is 6.03 mm, and the value of the half of the diagonal length ImgH of the effective pixel area on the imaging surface S15 is 3.07 mm.

In Embodiment 1, both the object side surface and the image side surface of any one of the first lens E1 to the sixth lens E6 are aspheric surfaces, and the surface shape x of each aspheric lens can be defined by, but not limited to, the following aspheric Equation:

$$x = \frac{ch^2}{1+\sqrt{1-(k+1)c^2h^2}} + \sum A_i h^i \quad (1)$$

Here, x is the sag—the axis-component of the displacement of the surface from the aspheric vertex, when the surface is at a height h from the optical axis; c is a paraxial curvature of the aspheric surface, c=1/R (namely, the paraxial curvature c is a reciprocal of the radius of curvature R in Table 1); k is the conic coefficient (given in Table 1); and Ai is the correction coefficient of the $i^{th}$ order of aspheric surface. Table 2 shows high-order coefficients $A_4$, $A_6$, $A_8$, $A_{10}$, $A_{12}$, $A_{14}$, $A_{16}$, $A_{18}$ and $A_{20}$ applied to the aspheric mirror surfaces S1-S12 in embodiment 1.

TABLE 2

| Surface number. | A4 | A6 | A8 | A10 | A12 | A14 | A16 | A18 | A20 |
| --- | --- | --- | --- | --- | --- | --- | --- | --- | --- |
| S1 | −2.8354E−04 | −1.3343E−02 | 2.8542E−02 | −4.3743E−02 | 4.0962E−02 | −2.4693E−02 | 9.6299E−03 | −2.5744E−03 | 5.4216E−04 |
| S2 | 1.0537E−01 | −3.1482E−01 | 5.7282E−01 | −6.4029E−01 | 4.5411E−01 | −2.0445E−01 | 5.6430E−02 | −8.6865E−03 | 5.7014E−04 |
| S3 | 6.6645E−02 | −2.6457E−01 | 4.8541E−01 | −4.4218E−01 | 1.7493E−01 | 2.8035E−02 | −5.5510E−02 | 1.9673E−02 | −2.1511E−03 |
| S4 | −2.8070E−02 | 8.4479E−02 | −3.5963E−01 | 1.0675E+00 | −1.7185E+00 | 1.6029E+00 | −8.4763E−01 | 2.1774E−01 | −9.7580E−03 |
| S5 | −1.6869E−02 | −2.4927E−02 | 3.2481E−01 | −9.2593E−01 | 1.6426E+00 | −1.8157E+00 | 1.2047E+00 | −4.2767E−01 | 5.3519E−02 |
| S6 | −8.6449E−02 | 7.2659E−02 | −1.3988E−01 | 3.5027E−01 | −5.5945E−01 | 5.1214E−01 | −2.5774E−01 | 5.7051E−02 | −1.5709E−03 |
| S7 | −2.3587E−01 | −7.0239E−02 | 2.9250E−01 | −7.9107E−01 | 1.3210E+00 | −1.2502E+00 | 5.5645E−01 | −6.6595E−02 | 1.0628E−03 |
| S8 | −1.9387E−01 | 4.8284E−02 | −4.5169E−02 | 1.2832E−01 | −1.2877E−01 | 6.9155E−02 | −3.0554E−02 | 1.6560E−02 | −4.3507E−03 |
| S9 | −4.7610E−01 | 4.6426E−01 | 2.7447E−01 | −3.6631E+00 | 9.6420E+00 | −1.3809E+01 | 1.1787E+01 | −5.3063E+00 | 9.0861E−03 |
| S10 | −5.7223E−01 | 9.7513E−01 | −1.3437E+00 | 9.9517E−01 | 1.2162E−01 | −1.1585E+00 | 1.3876E+00 | −9.5616E−01 | 4.3657E−01 |
| S11 | −1.3569E−01 | 1.6702E−01 | 1.9830E−02 | −3.0418E−01 | 4.2940E−01 | −3.4276E−01 | 1.8301E−01 | −6.8848E−02 | 1.8534E−02 |
| S12 | −1.4861E−01 | 1.7449E−01 | −2.1791E−01 | 2.6178E−01 | −2.3806E−01 | 1.5235E−01 | −6.8731E−02 | 2.2081E−02 | −5.0638E−03 |

Figure 2A:
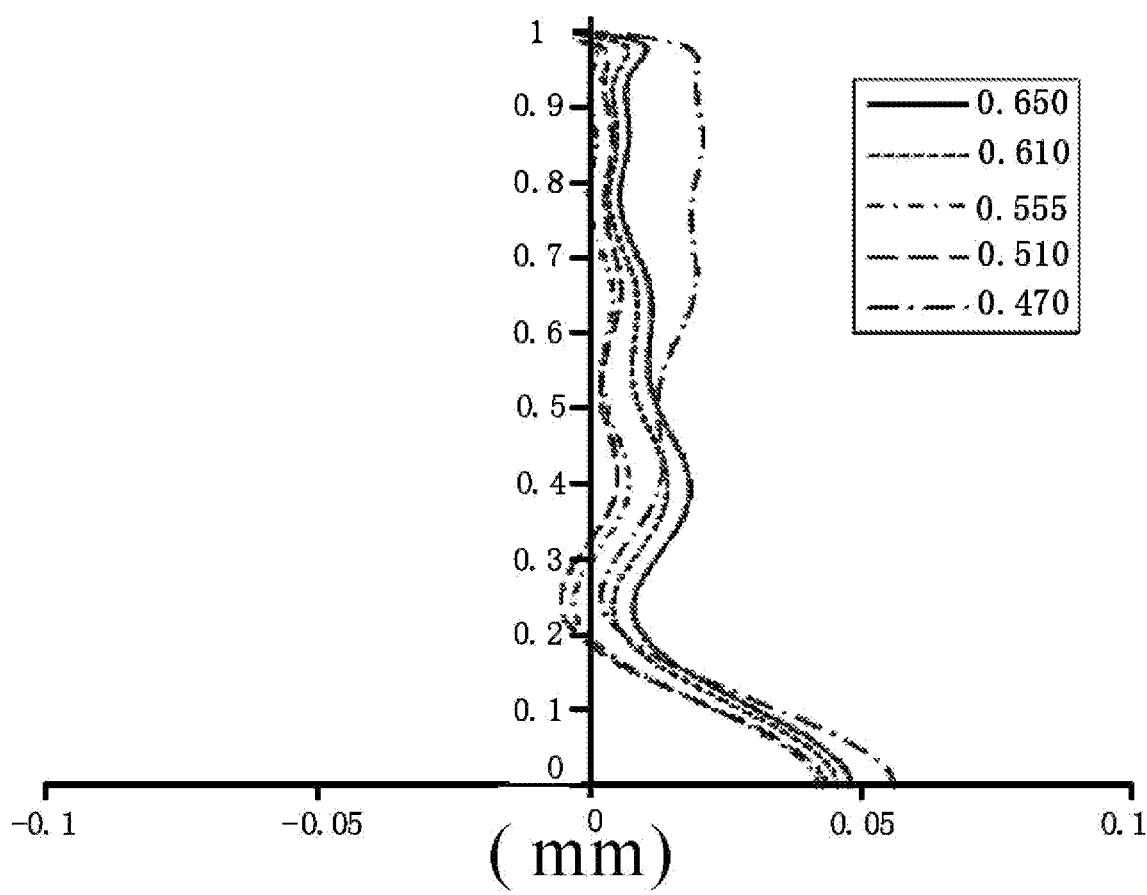
FIGS. 2A to 2D show a longitudinal aberration curve, an astigmatism curve, a distortion curve and a lateral color curve of the optical imaging lens of Embodiment 1, respectively.
Figure 2B:
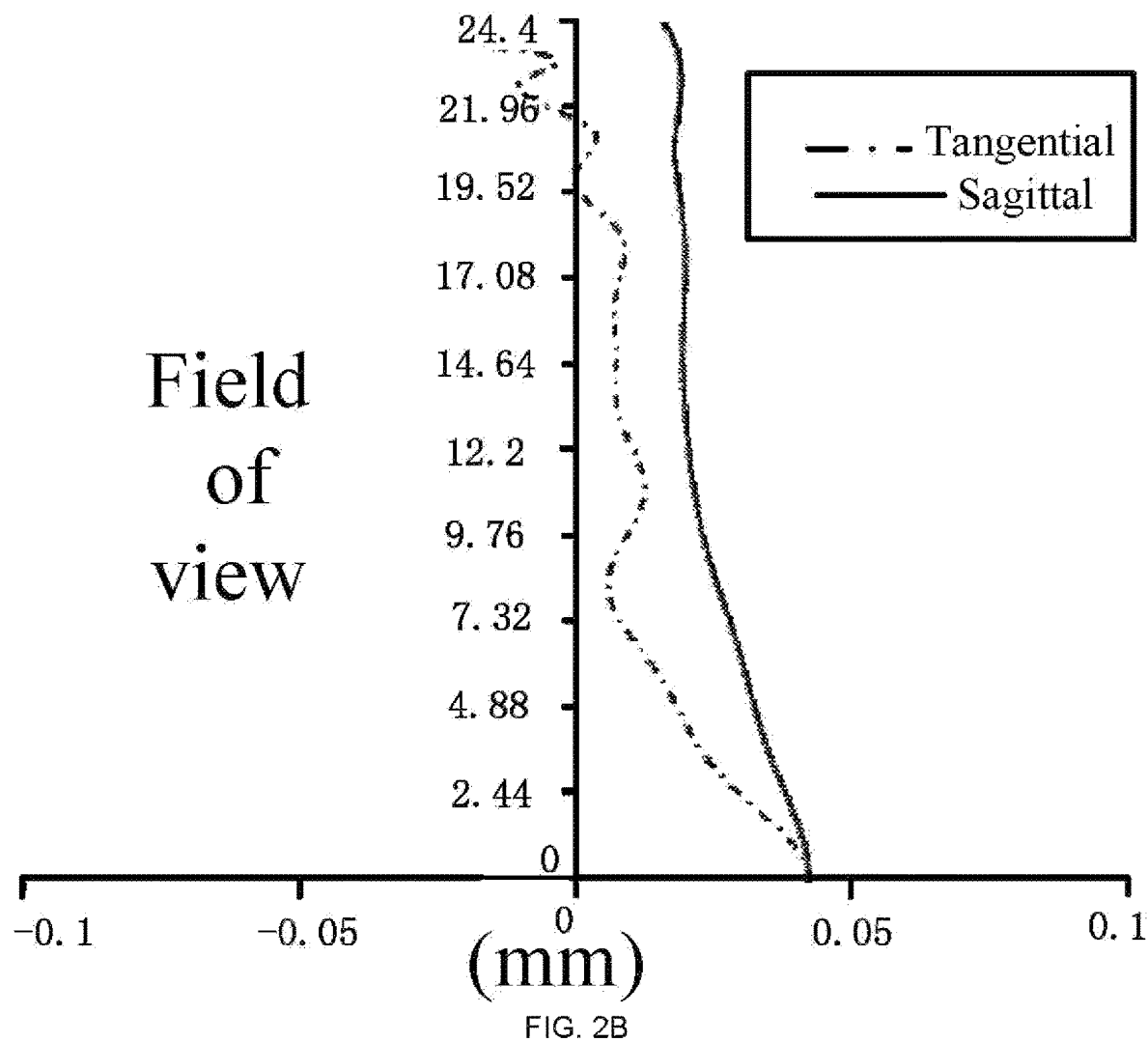
Figure 2C:
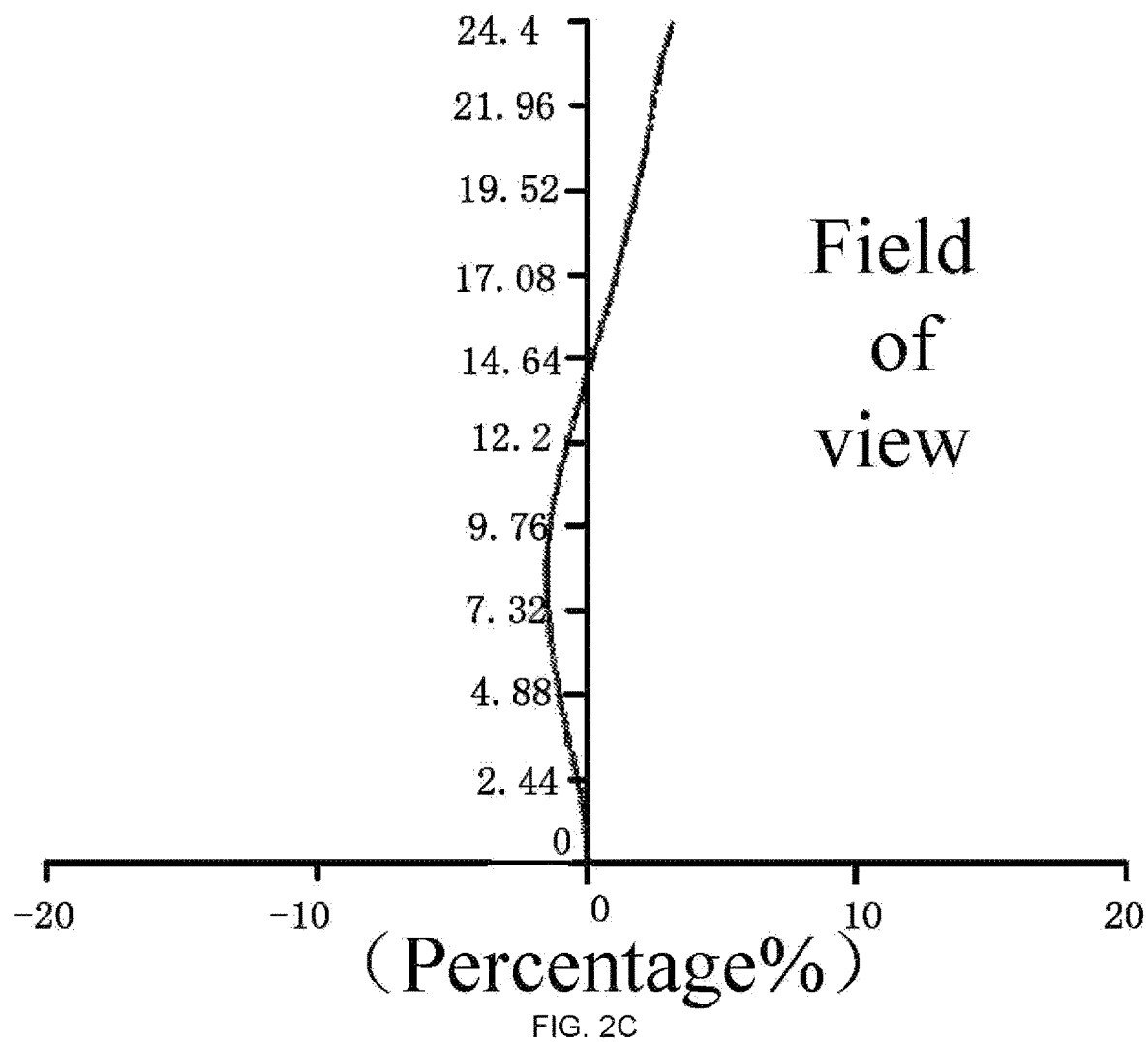
Figure 2D:
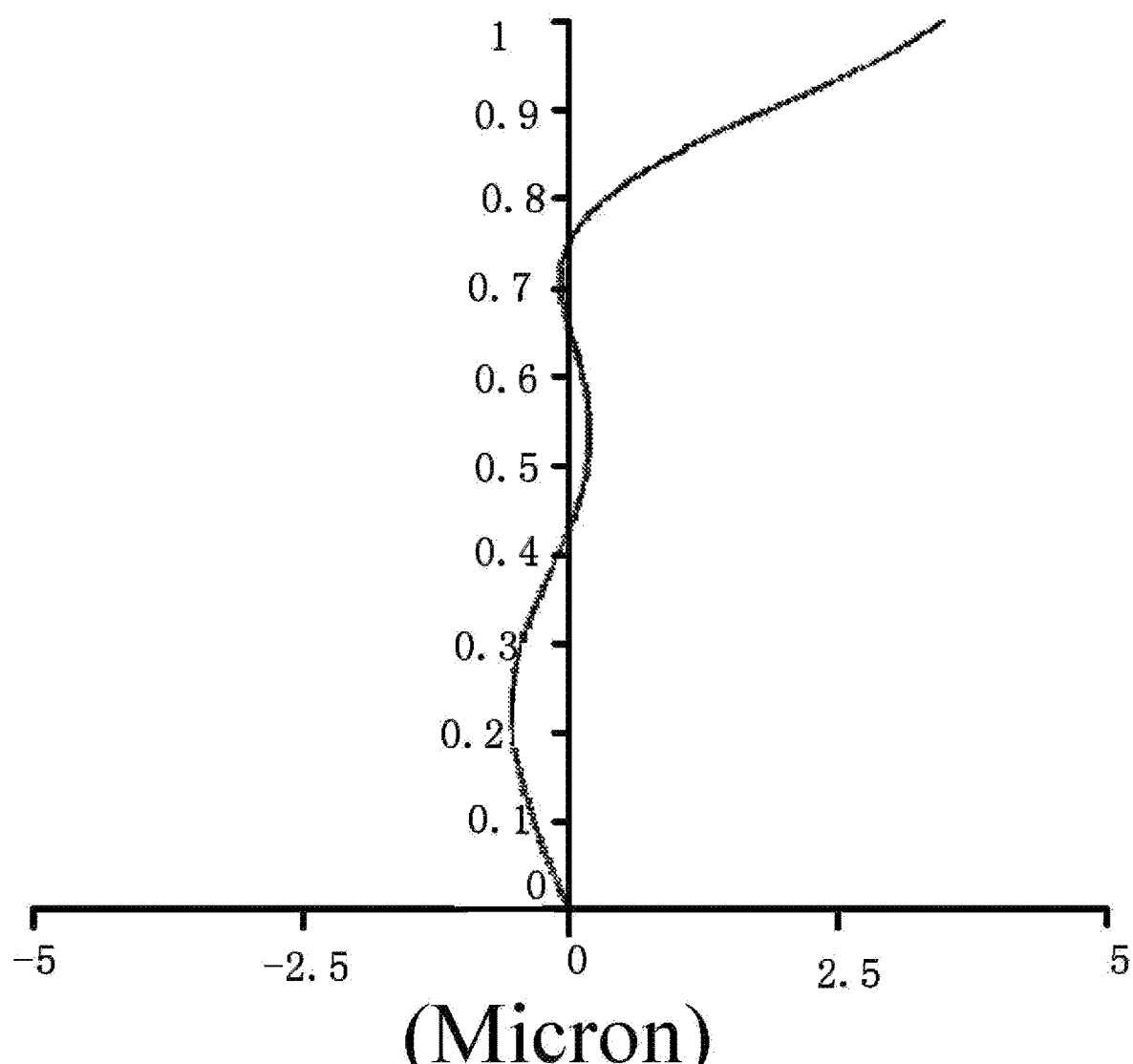

FIG. 2A shows a longitudinal aberration curve of the optical imaging lens of Embodiment 1, which indicates the deviations of light of different wavelengths from a convergent focus point after passing through the lens. FIG. 2B shows an astigmatic curve of the optical imaging lens of Embodiment 1, which indicates a tangential image plane curvature and an sagittal image plane curvature. FIG. 2C shows a distortion curve of the optical imaging lens of Embodiment 1, which indicates a distortion value under different viewing angles. FIG. 2D shows the lateral color curve of the optical imaging lens of Embodiment 1, which indicates the deviation of different image heights on the imaging surface of light passing through the lens. It can be seen from FIGS. 2A to 2D that, the optical imaging lens provided in Embodiment 1 can achieve good imaging quality.

Embodiment 2

Figure 3:
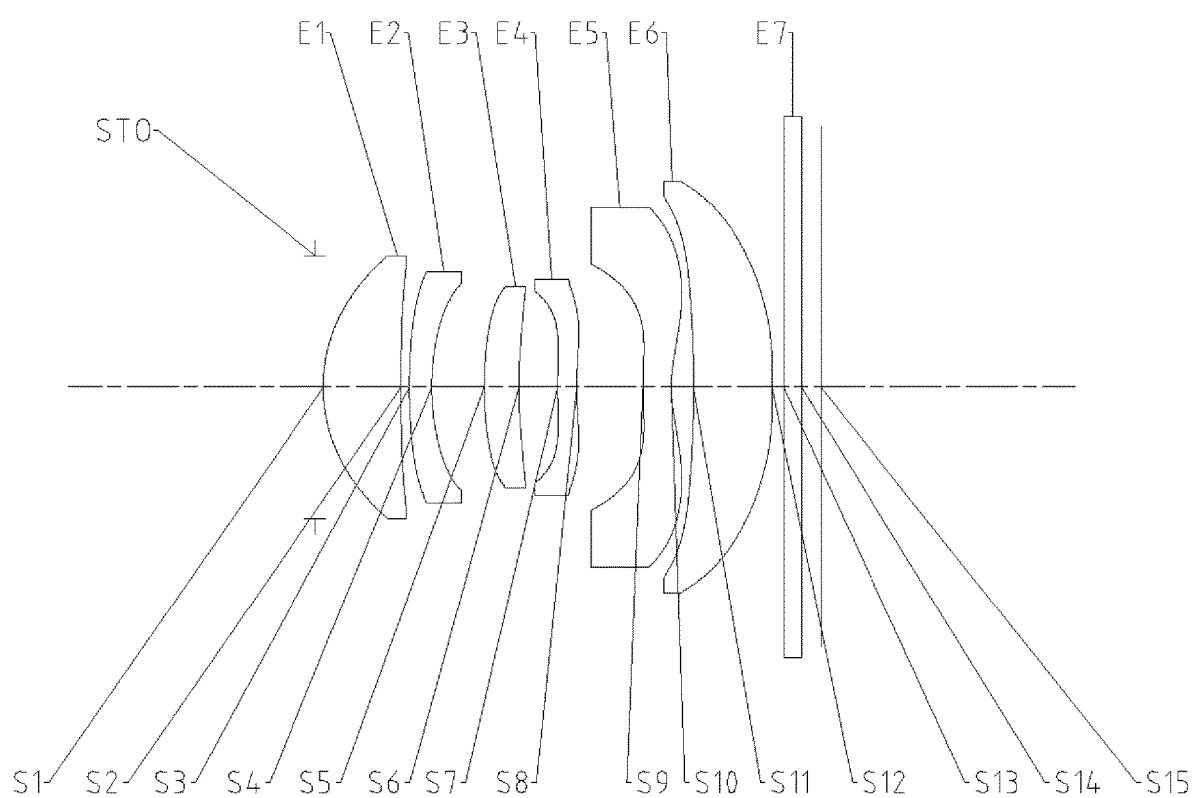
FIG. 3 is a schematic view showing a structure of an optical imaging lens according to Embodiment 2 of the disclosure.

An optical imaging lens according to Embodiment 2 of the disclosure is described below with reference to FIGS. 3 to 4D. In this embodiment and the following embodiments, a description similar to that of Embodiment 1 will be omitted for the sake of brevity. FIG. 3 is a schematic view showing a structure of an optical imaging lens according to Embodiment 2 of the disclosure.

As shown in FIG. 3, the optical imaging lens includes sequentially from an object side to an image side along an optical axis: a diaphragm STO, a first lens E1, a second lens E2, a third lens E3, a fourth lens E4, a fifth lens E5, a sixth tens E6, and an optical filter E7.

The first lens E1 has a positive refractive power, an object side surface S1 of the first lens is a convex surface and an image side surface S2 of the first lens is a concave surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third tens is a concave surface. The fourth lens E4 has a negative refractive power, an object side surface S7 of the fourth lens is a convex surface and an image side surface S8 of the fourth lens is a concave surface. The fifth lens E5 has a negative refractive power, an object side surface S9 of the fifth lens is a convex surface and an image side surface S10 of the fifth lens is a concave surface. The sixth lens E6 has a positive refractive power, an object side surface S11 of the sixth lens is a convex surface and an image aide surface S12 of the sixth lens is a concave surface. The fitter E7 has an object side S13 and an image side S14. The optical imaging lens has an imaging surface S15 through, light from an object passes through S1 to S14 sequentially and is finally imaged at the imaging surface S15.

In this embodiment, the value of the total effective focal length 1 of the optical imaging lens is 6.23 mm, the value of the on-axis distance TTL from the object side SI of the first lens EI to the imaging surface S15 is 5.87 mm, and the value of the half of the diagonal length ImgH of the effective pixel area on the imaging surface S15 is 3.07 mm.

Table 3 shows a basic parameter table of the optical imaging lens of Embodiment 2, and the units of radius of curvature, thickness/distance, and focal length are all millimeters (mm). Table 4 shows higher order term coefficients that can be used for each aspherical mirror in Embodiment 2, wherein each aspherical surface type can be defined by Equation (1) given in Embodiment 1 above.

TABLE 3

| Surface number | Surface type | Radius of curvature | Thickness/ Distance | Materials Refractive Index | Abbe number | Focal length | Conic coefficient |
|---|---|---|---|---|---|---|---|
| OBJ | Spherical | Infinity | Infinity | | | | |
| STO | Spherical | Infinity | 0.1000 | | | | |
| S1 | Aspheric | 1.8728 | 0.9153 | 1.55 | 56.1 | 3.55 | 0.0282 |
| S2 | Aspheric | 46.4133 | 0.1000 | | | | 0.0000 |
| S3 | Aspheric | 6.5034 | 0.2634 | 1.68 | 19.2 | −7.74 | −2.3530 |
| S4 | Aspheric | 2.8551 | 0.6164 | | | | 0.6484 |
| S5 | Aspheric | 4.1649 | 0.4096 | 1.54 | 55.7 | 25.03 | −6.4147 |
| S6 | Aspheric | 5.8053 | 0.4661 | | | | 6.4031 |
| S7 | Aspheric | 6.6605 | 0.2255 | 1.67 | 20.4 | −17.21 | 15.9462 |
| S8 | Aspheric | 4.1585 | 0.7868 | | | | −12.2675 |
| S9 | Aspheric | 4.5426 | 0.3326 | 1.54 | 55.7 | −5.07 | −16.6191 |
| S10 | Aspheric | 1.6598 | 0.2607 | | | | −1.3538 |
| S11 | Aspheric | −305.8856 | 0.9275 | 1.68 | 19.2 | 47.44 | 0.0000 |
| S12 | Aspheric | −29.1219 | 0.1363 | | | | 0.0000 |
| S13 | Spherical | Infinity | 0.2100 | 1.52 | 64.2 | | |
| S14 | Spherical | Infinity | 0.2297 | | | | |
| S15 | Spherical | Infinity | | | | | |

TABLE 4

| Surface number. | A4 | A6 | A8 | A10 | A12 | A14 | A16 | A18 | A20 |
|---|---|---|---|---|---|---|---|---|---|
| S1 | −1.6636E−03 | −5.6089E−03 | 1.2758E−02 | −2.1640E−02 | 2.1361E−02 | −1.3090E−02 | 4.8074E−03 | −9.8453E−04 | 8.5961E−05 |
| S2 | 1.2080E−02 | 7.7237E−03 | −1.7925E−02 | 2.0092E−02 | −1.3374E−02 | 4.7882E−03 | −7.9726E−04 | 3.0299E−05 | 3.9630E−06 |
| S3 | −1.4738E−02 | 3.2687E−02 | −8.8563E−03 | −1.7961E−02 | 3.7117E−02 | −3.3011E−02 | 1.5691E−02 | −3.8483E−03 | 3.8563E−04 |
| S4 | −2.8966E−02 | 5.6990E−02 | −6.6561E−02 | 1.4416E−01 | −2.2052E−01 | 2.1831E−01 | −1.2986E−01 | 4.1862E−02 | −5.5869E−03 |
| S5 | −4.0084E−03 | −2.2234E−02 | 2.0968E−01 | −5.4275E−01 | 8.8924E−01 | −9.1126E−01 | 5.7152E−01 | −2.0056E−01 | 3.0327E−02 |
| S6 | −4.9861E−02 | 4.1761E−02 | −8.5208E−02 | 2.0986E−01 | −3.5966E−01 | 3.9541E−01 | −2.6622E−01 | 1.0019E−01 | −1.6270E−02 |
| S7 | −1.9863E−01 | −9.6725E−02 | 4.9802E−01 | −1.4017E−00 | 2.2966E+00 | −2.3437E+00 | 1.4516E+00 | −5.0285E−01 | 7.6285E−02 |
| S8 | −1.5434E−01 | 2.0925E−02 | 9.5885E−02 | −2.9226E−01 | 4.4676E−01 | −4.0202E−01 | 2.1578E−01 | −6.3256E−02 | 7.8940E−03 |
| S9 | −2.9420E−01 | 2.0856E−01 | −2.5676E−01 | 2.6528E−01 | −2.0031E−01 | 1.0568E−01 | −3.7136E−02 | 7.5610E−03 | −6.4248E−04 |
| S10 | −3.5788E−01 | 4.1190E−01 | −3.9487E−01 | 2.0126E−01 | 5.9038E−02 | −1.9675E−01 | 1.7384E−01 | −9.1255E−02 | 3.1936E−02 |
| S11 | −1.0189E−01 | 8.7892E−02 | 1.3005E−01 | −4.2507E−01 | 5.4842E−01 | −4.3856E−01 | 2.4007E−01 | −9.3212E−02 | 2.5941E−02 |
| S12 | −1.7579E−01 | 2.0494E−01 | −2.5235E−01 | 2.9635E−01 | −2.7001E−01 | 1.7586E−01 | −8.1138E−02 | 2.6678E−02 | −6.2612E−03 |

Figure 4A:
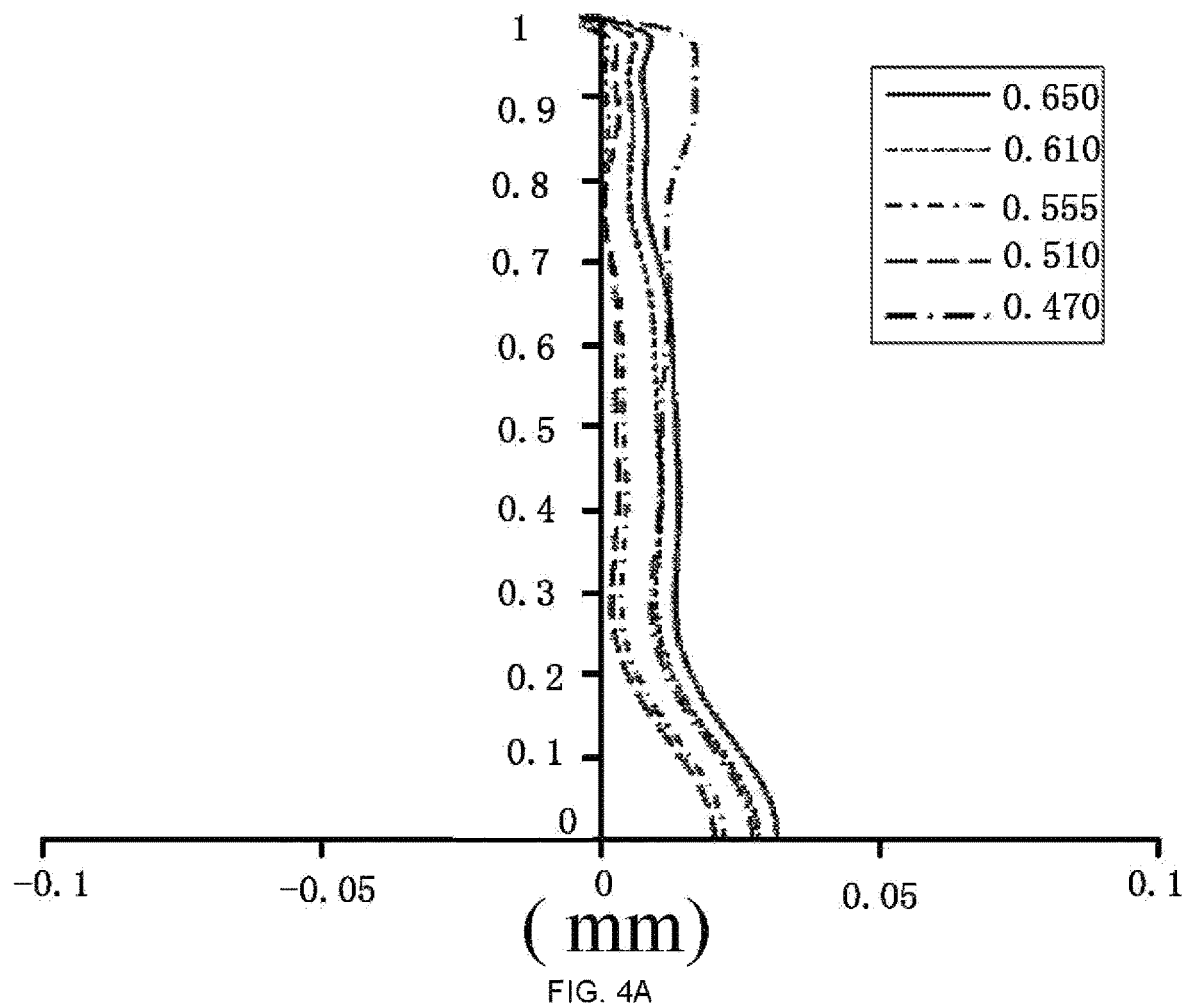
FIGS. 4A to 4D show a longitudinal aberration curve, an astigmatism curve, a distortion curve, and a lateral color curve of the optical imaging lens of Embodiment 2, respectively.
Figure 4B:
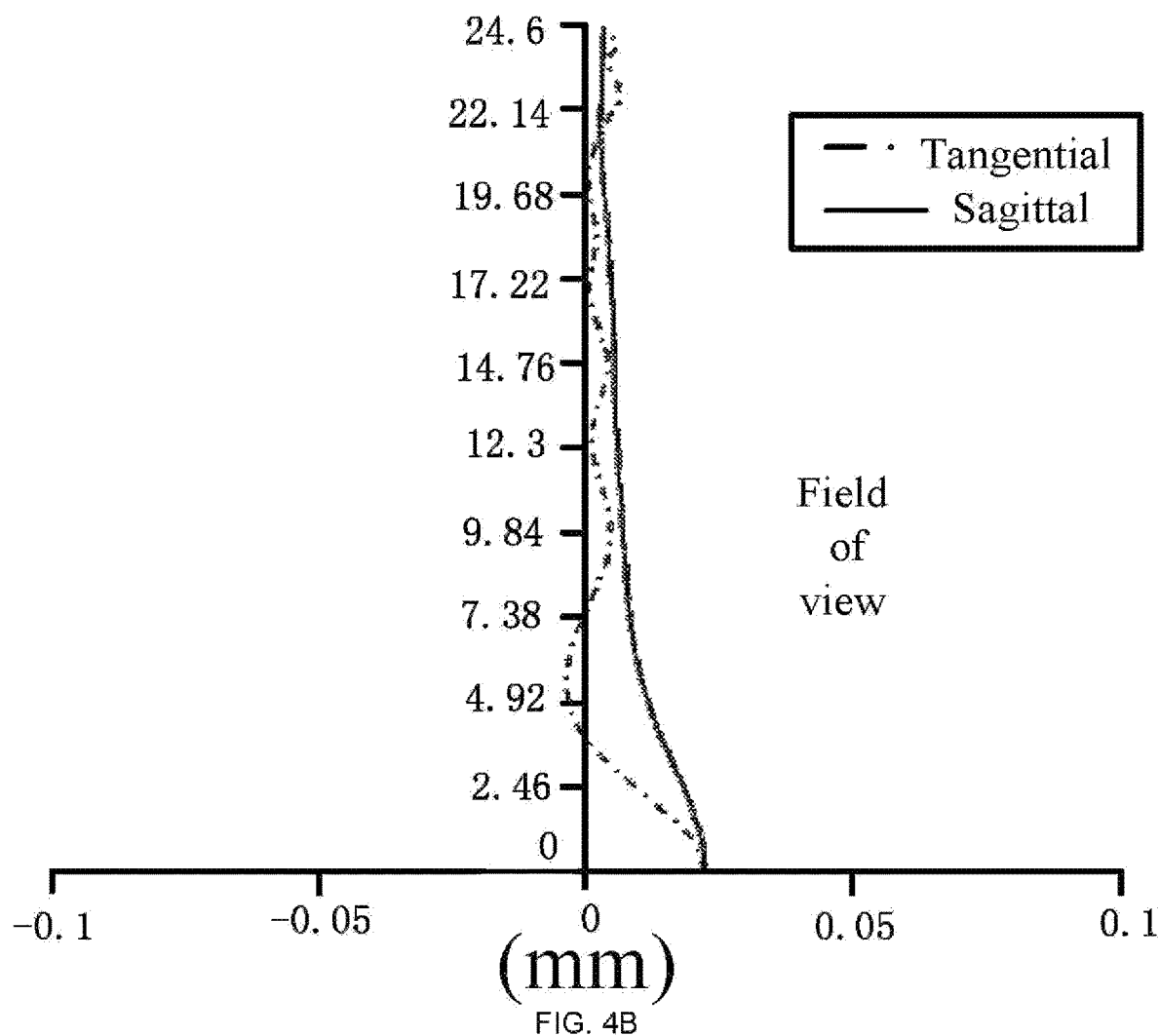
Figure 4C:
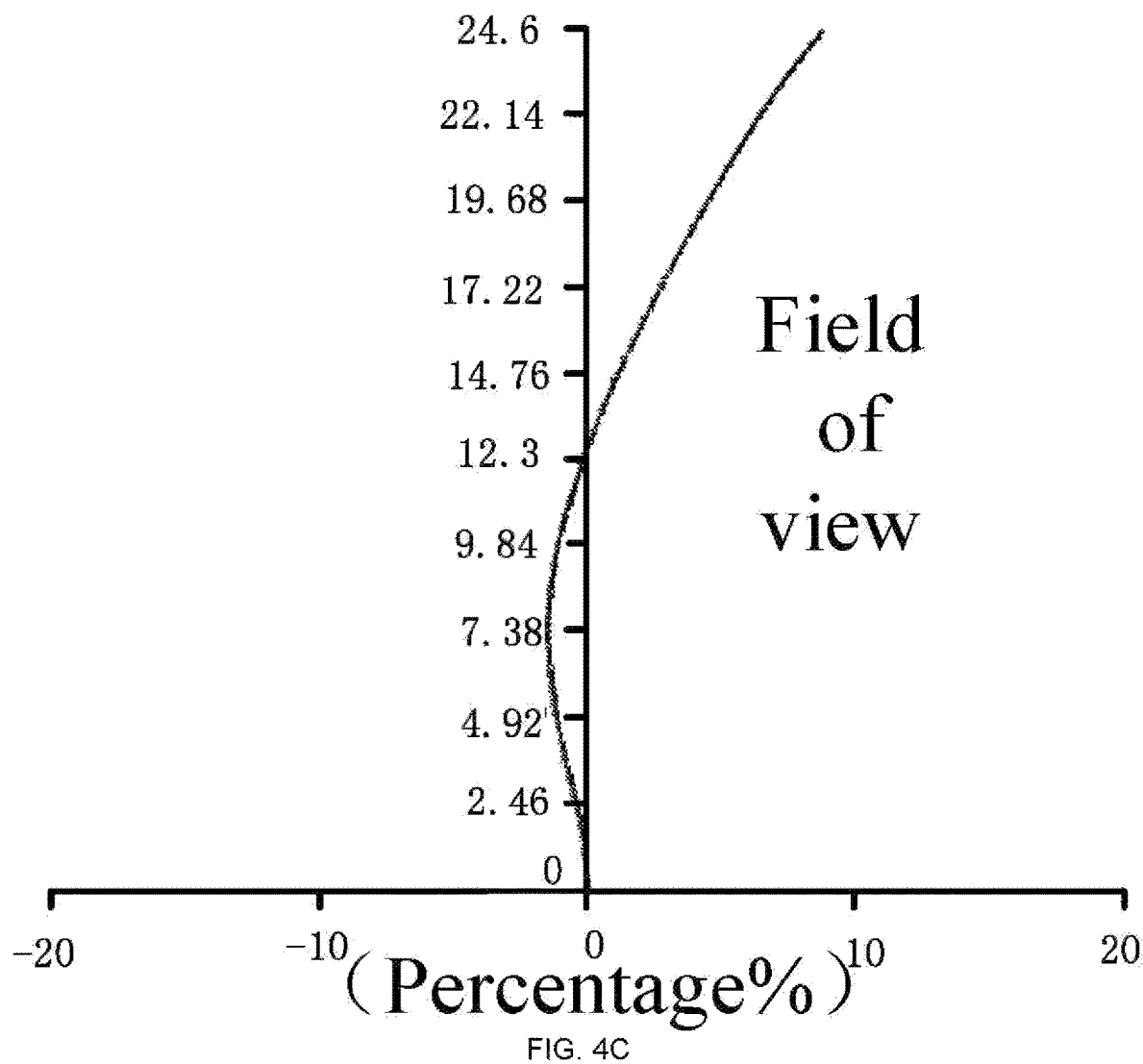
Figure 4D:
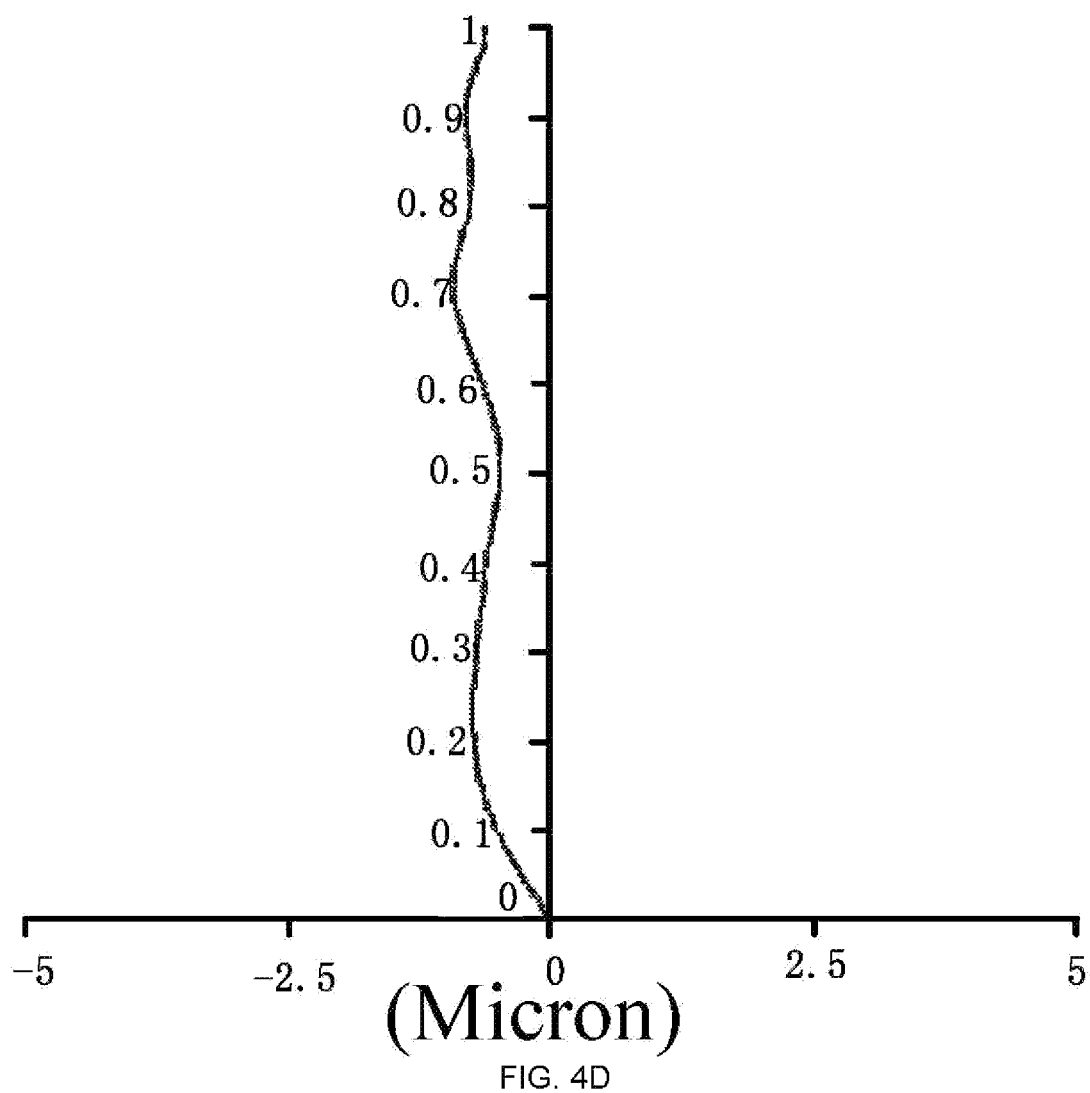

FIG. 4A shows a longitudinal aberration curve of the optical imaging lens of Embodiment 2, which indicates the deviations of light of different wavelengths from a convergent focus point after passing through the lens. FIG. 4B shows an astigmatic curve of the optical imaging lens of Embodiment 2, which indicates a tangential image plane curvature and an sagittal image plane curvature. FIG. 4C shows a distortion curve of the optical imaging lens of Embodiment 2, which indicates a distortion value under different viewing angles. FIG. 4D shows the lateral color curve of the optical imaging lens of Embodiment 2, which indicates the deviation of different image heights on the imaging surface of light passing through the lens. It can be seen from FIGS. 4A to 4D that, the optical imaging lens provided in Embodiment 2 can achieve good imaging quality.

Embodiment 3

Figure 5:
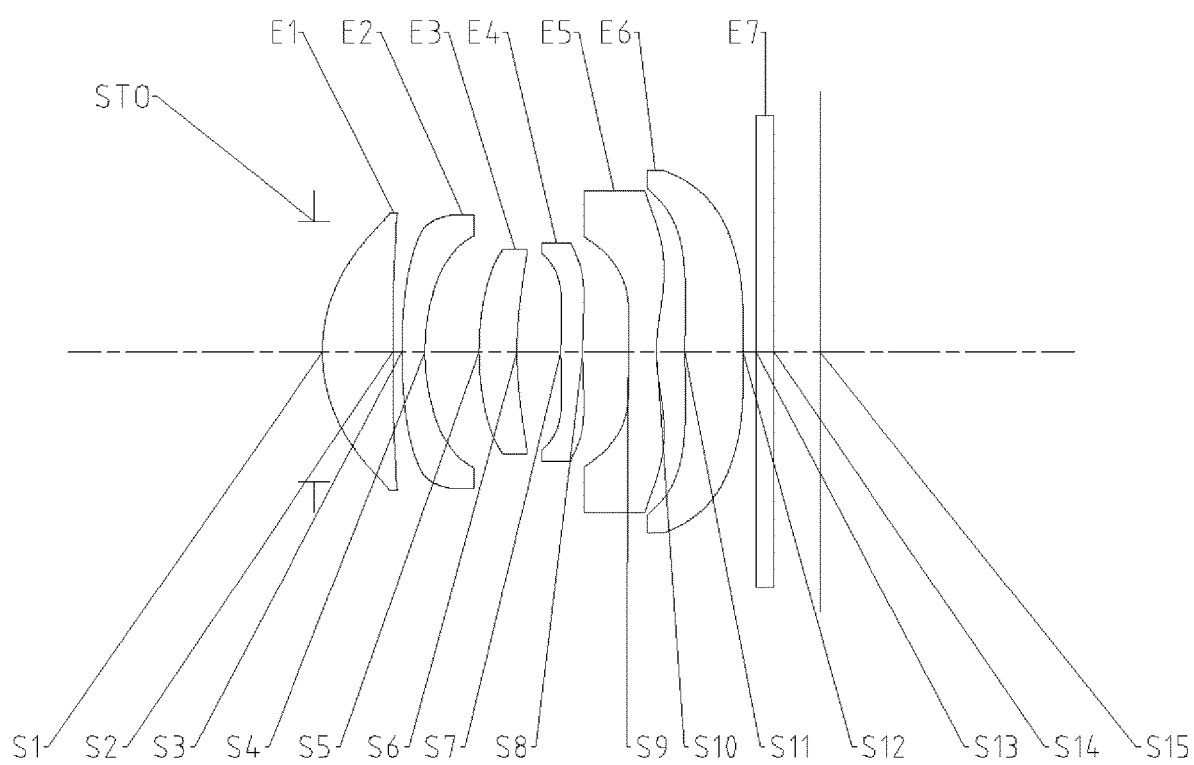
FIG. 5 is a schematic view showing a structure of an optical imaging lens according to Embodiment 3 of the disclosure.

An optical imaging lens according to Embodiment 3 of the disclosure is described below with reference to FIGS. 5 to 6D. FIG. 5 is a schematic view showing a structure of an optical imaging lens according to Embodiment 3 of the disclosure.

As shown in FIG. 5, the optical imaging lens includes sequentially from an object side to an image side along an optical axis: a diaphragm STO, a first lens E1, a second lens E2, a third lens E3, a fourth lens E4, a fifth lens E5, a sixth lens E6, and an optical filter E7.

The first lens E1 has a positive refractive power, an object side surface S1 of the first lens is a convex surface and an image side surface S2 of the first lens is a concave surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third lens is a concave surface. The fourth lens E4 has a negative refractive power, an object side surface S7 of the fourth lens is a convex surface and an image side surface S8 of the fourth lens is a concave surface. The fifth lens E5 has a negative refractive power, an object side surface S9 of the fifth lens is a convex surface and an image side surface S10 of the fifth lens is a concave surface. The sixth lens E6 has a positive refractive power, an object side surface S11 of the sixth lens is a convex surface and a an image side surface S12 of the sixth lens is a concave surface. The filter E7 has an object side S13 and an image side S14. The optical imaging lens has an imaging surface S15 through, light from an object passes through S1 to S14 sequentially and is finally imaged at the imaging surface S15.

In this embodiment, the value of the total effective focal length f of the optical imaging lens is 6.00 mm, the value of the on-axis distance TTL from the object side SI of the first lens EI to the imaging surface S15 is 5.86 mm, and the value of the half of the diagonal length ImgH of the effective pixel area on the imaging surface S15 is 3.07 mm.

Table 5 shows a basic parameter table of the optical imaging lens of Embodiment 3, and the units of radius of curvature, thickness/distance, and focal length are millimeters (mm). Table 6 shows higher order term coefficients that can be used for each aspherical mirror in Embodiment 3, wherein each aspherical surface type can be defined by Equation (1) given in Embodiment 1 above.

TABLE 5

| Surface number | Surface type | Radius of curvature | Thickness/ Distance | Materials | | Focal length | Conic coefficient |
|---|---|---|---|---|---|---|---|
| | | | | Refractive Index | Abbe number | | |
| OBJ | Spherical | Infinity | Infinity | | | | |
| STO | Spherical | Infinity | 0.1000 | | | | |
| S1 | Aspheric | 1.8963 | 0.8269 | 1.55 | 56.1 | 3.57 | 0.0183 |
| S2 | Aspheric | 60.0000 | 0.1086 | | | | 278.8809 |
| S3 | Aspheric | 6.0202 | 0.2715 | 1.68 | 19.2 | −7.02 | −0.0605 |
| S4 | Aspheric | 2.6088 | 0.6363 | | | | 0.0749 |
| S5 | Aspheric | 3.3524 | 0.4454 | 1.54 | 55.7 | 25.74 | −4.7999 |
| S6 | Aspheric | 4.2195 | 0.5171 | | | | .19955 |
| S7 | Aspheric | 7.0494 | 0.2615 | 1.67 | 20.4 | −42.68 | −1.6881 |
| S8 | Aspheric | 5.5665 | 0.5404 | | | | −16.5263 |
| S9 | Aspheric | 6.7316 | 0.3297 | 1.54 | 55.7 | −5.28 | −114.2302 |
| S10 | Aspheric | 1.9609 | 0.3346 | | | | −1.2994 |
| S11 | Aspheric | 9.8587 | 0.6852 | 1.68 | 19.2 | 17.20 | −29.4034 |
| S12 | Aspheric | 62.1095 | 0.1535 | | | | 0.0000 |
| S13 | Spherical | Infinity | 0.2100 | 1.52 | 64.2 | | |
| S14 | Spherical | Infinity | 0.5415 | | | | |
| S15 | Spherical | Infinity | | | | | |

TABLE 6

| Surface number. | A4 | A6 | A8 | A10 | A12 | A14 | A16 | A18 | A20 |
|---|---|---|---|---|---|---|---|---|---|
| S1 | −2.6936E−03 | −2.3954E−03 | 4.0224E−03 | −9.4496E−03 | 1.1348E−02 | −8.3336E−03 | 3.5644E−03 | −8.1985E−04 | 7.5408E−05 |
| S2 | 7.7482E−03 | 1.2074E−03 | −2.9042E−03 | 2.0840E−03 | 1.5562E−03 | −4.1984E−03 | 3.1102E−03 | −1.0507E−03 | 1.3749E−04 |
| S3 | −1.1174E−02 | 2.3626E−02 | −1.1877E−02 | 9.7090E−03 | −3.9011E−03 | −3.4548E−03 | 4.8783E−03 | −2.2291E−03 | 3.7507E−04 |
| S4 | −1.2240E−02 | 3.0848E−02 | 3.8127E−03 | −3.1131E−02 | 7.7315E−02 | −1.0286E−01 | 7.8985E−02 | −3.2880E−02 | 5.7277E−03 |
| S5 | 1.0511E−02 | 5.3519E−03 | 2.5891E−02 | −5.0116E−02 | 8.0945E−02 | −8.2017E−02 | 5.1853E−02 | −1.8630E−02 | 2.9499E−02 |
| S6 | −3.4596E−02 | −8.0051E−03 | 5.0405E−02 | −1.2309E−01 | 1.9941E−01 | −2.0558E−01 | 1.3031E−01 | −4.6219E−02 | 6.9149E−03 |
| S7 | −1.1150E−01 | −7.1728E−02 | 1.2263E−01 | −2.6602E−00 | 3.7912E−01 | −3.8399E−01 | 2.6514E−01 | −1.1448E−01 | 2.3079E−02 |
| S8 | −9.1230E−02 | −4.9215E−02 | 9.1533E−02 | −1.4529E−01 | 1.5667E−01 | −1.0550E−01 | 4.4351E−02 | −1.1269E−02 | 1.5488E−03 |

TABLE 6-continued

| Surface number. | A4 | A6 | A8 | A10 | A12 | A14 | A16 | A18 | A20 |
|---|---|---|---|---|---|---|---|---|---|
| S9 | −2.3775E−01 | 1.5285E−01 | −4.3790E−01 | 1.0141E+00 | −1.5756E+00 | 1.6197E+00 | −1.1032E+00 | 4.9739E−01 | −1.4662E−01 |
| S10 | −2.9771E−01 | 3.4497E−01 | −5.6776E−01 | 8.2513E−01 | −8.7821E−01 | 6.5879E−01 | −3.4744E−01 | 1.2898E−01 | −3.3488E−02 |
| S11 | −1.0835E−01 | 1.3928E−01 | −1.9957E−01 | 2.1790E−01 | −1.6149E−01 | 7.7282E−02 | −2.3281E−02 | 4.2117E−03 | −4.1169E−04 |
| S12 | −9.8974E−02 | 7.5349E−02 | −7.1286E−02 | 5.3318E−02 | −2.6733E−02 | 8.4467E−03 | −1.6144E−03 | 1.7020E−04 | −7.6080E−06 |

Figure 6A:
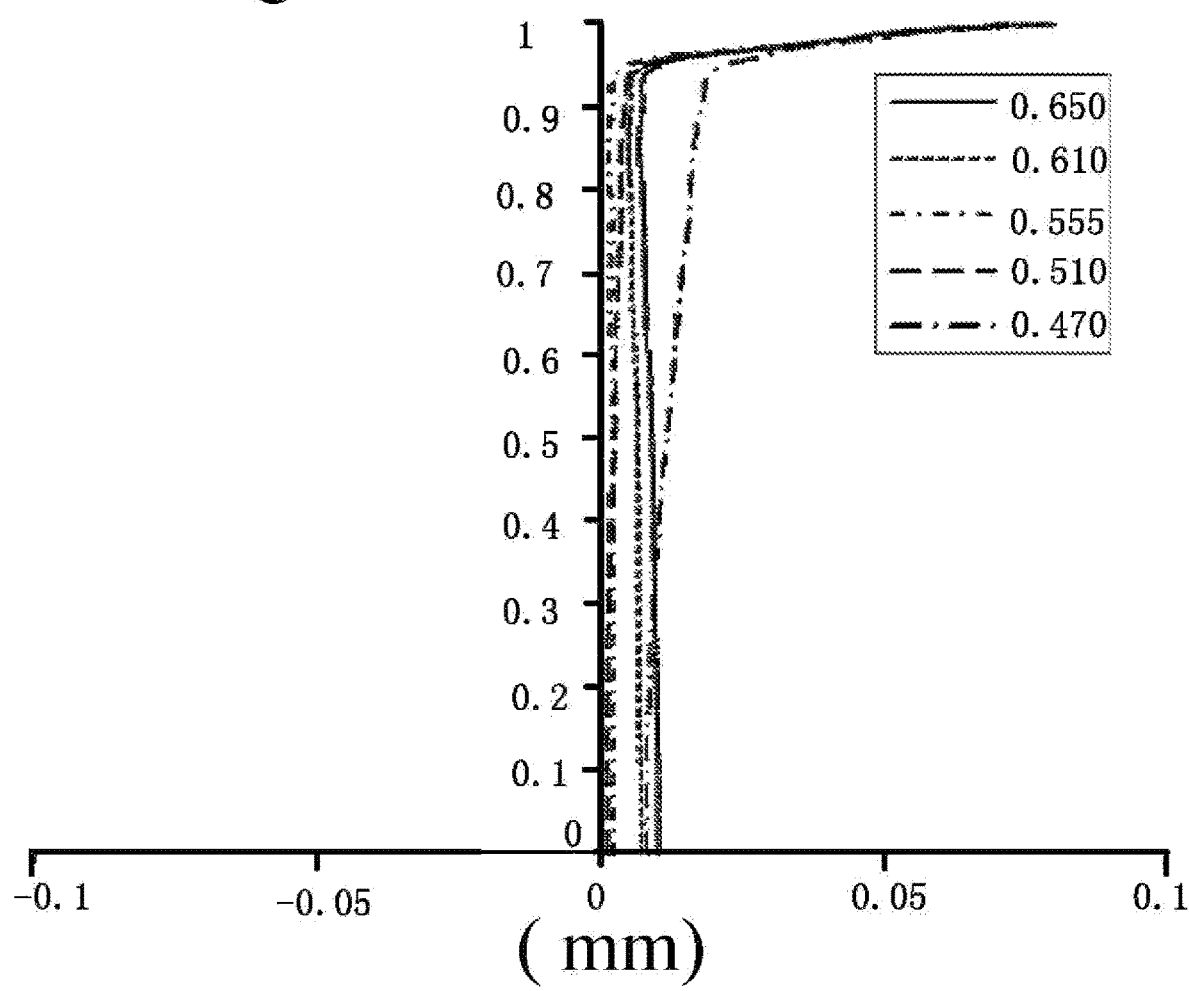
FIGS. 6A to 6D show a longitudinal aberration curve, an astigmatism curve, a distortion curve, and a lateral color curve, respectively, of the optical imaging lens of Embodiment 3.
Figure 6B:
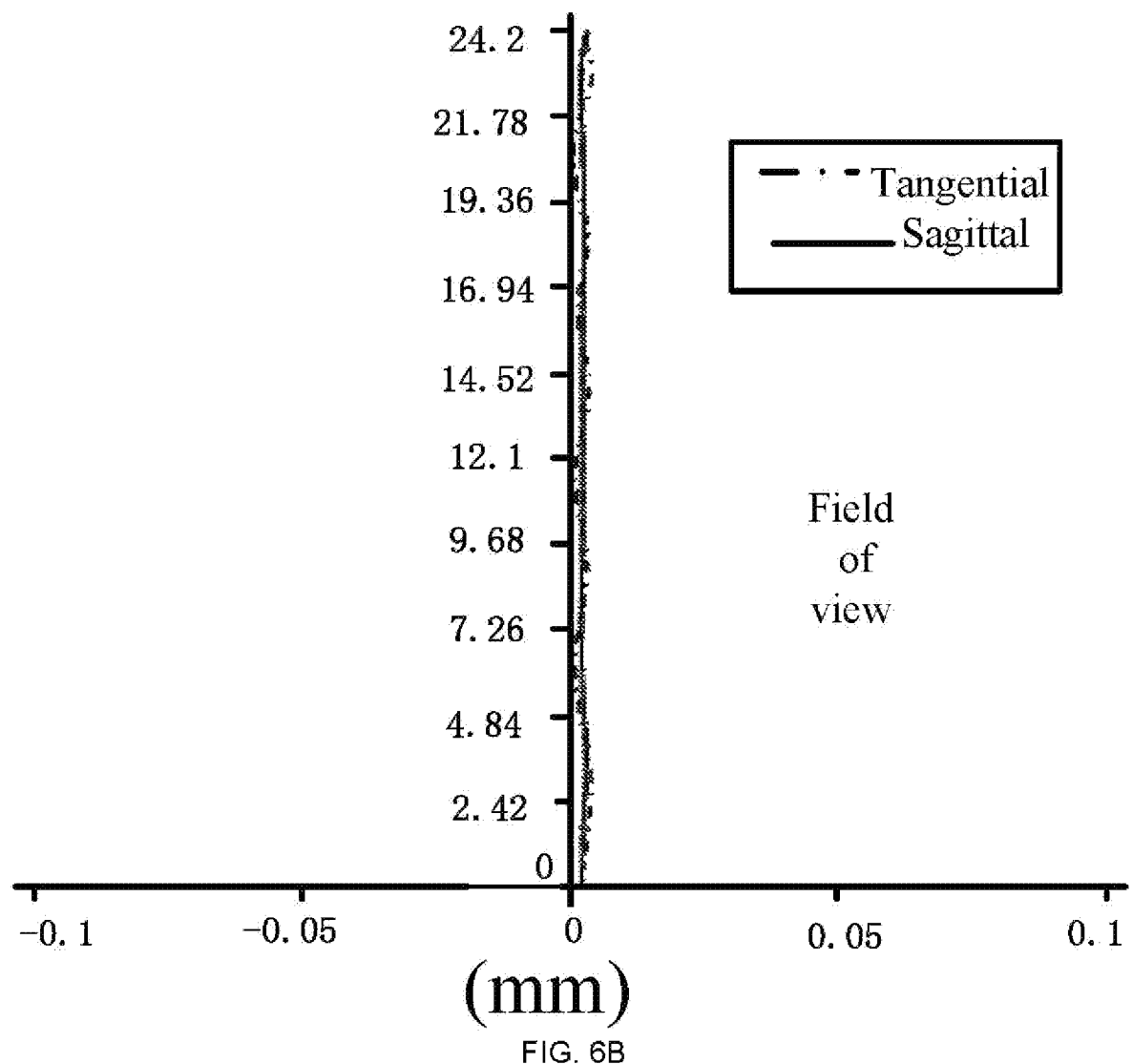
Figure 6C:
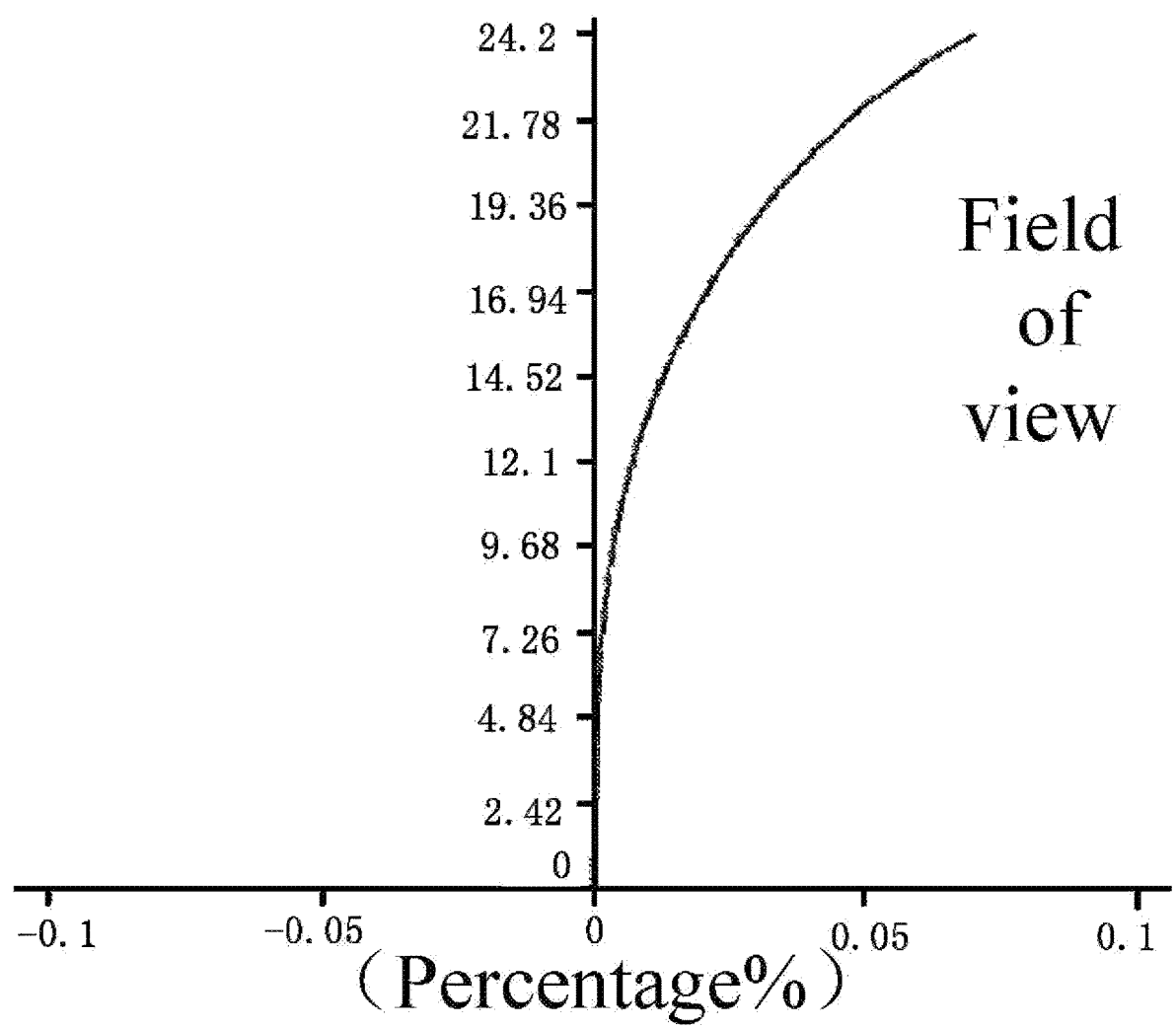
Figure 6D:
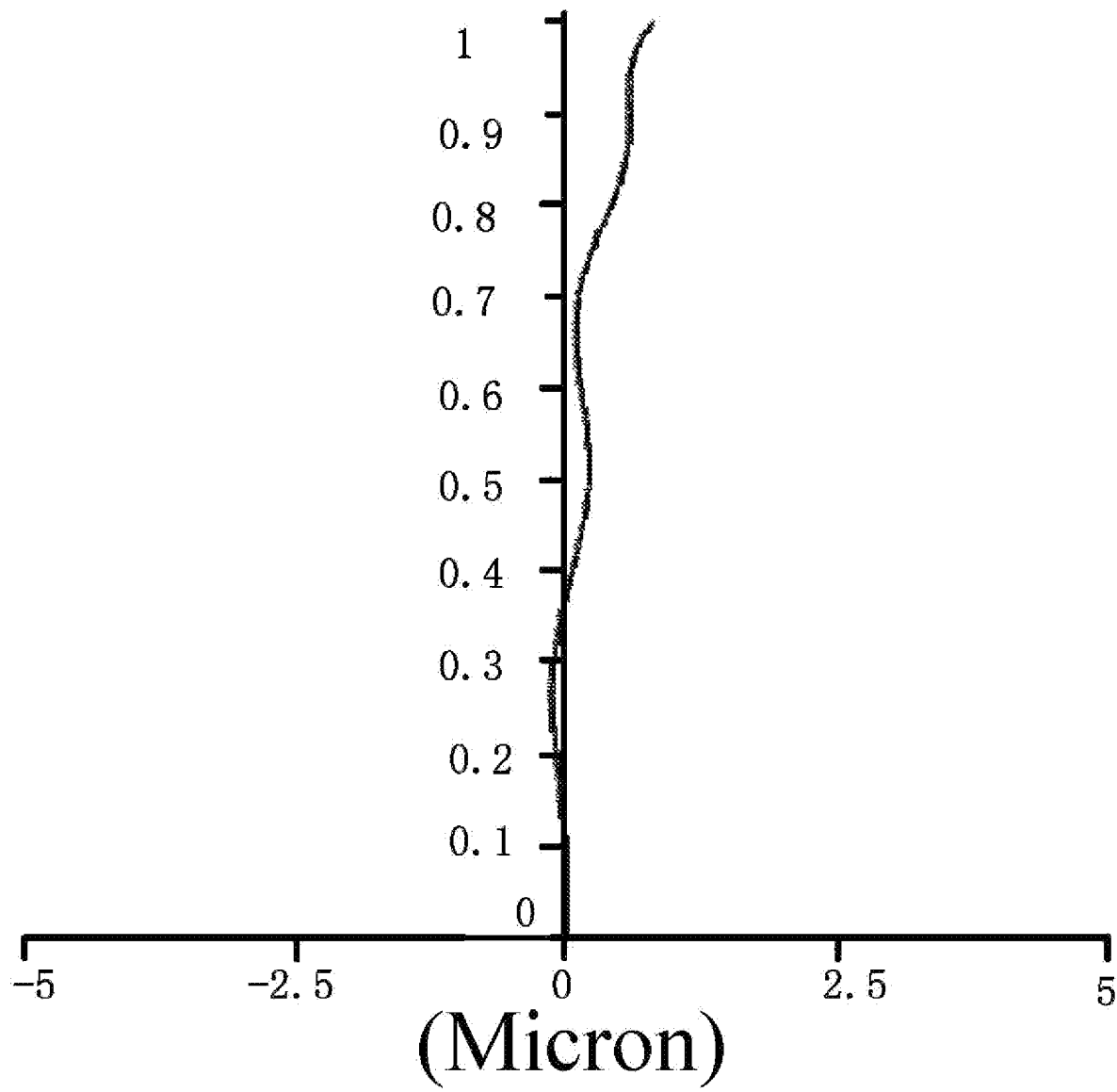

FIG. 6A shows a longitudinal aberration curve of the optical imaging lens of Embodiment 3, which indicates the deviations of light of different wavelengths from a convergent focus point after passing through the lens. FIG. 6B shows an astigmatic curve of the optical imaging lens of Embodiment 3, which indicates a tangential image plane curvature and an sagittal image plane curvature. FIG. 6C shows a distortion curve of the optical imaging lens of Embodiment 3, which indicates a distortion value under different viewing angles. FIG. 6D shows the lateral color curve of the optical imaging lens of Embodiment 3, which indicates the deviation of different image heights on the imaging surface of light passing through the lens. It can be seen from FIGS. 6A to 6D that, the optical imaging lens provided in Embodiment 3 can achieve good imaging quality.

Embodiment 4

Figure 7:
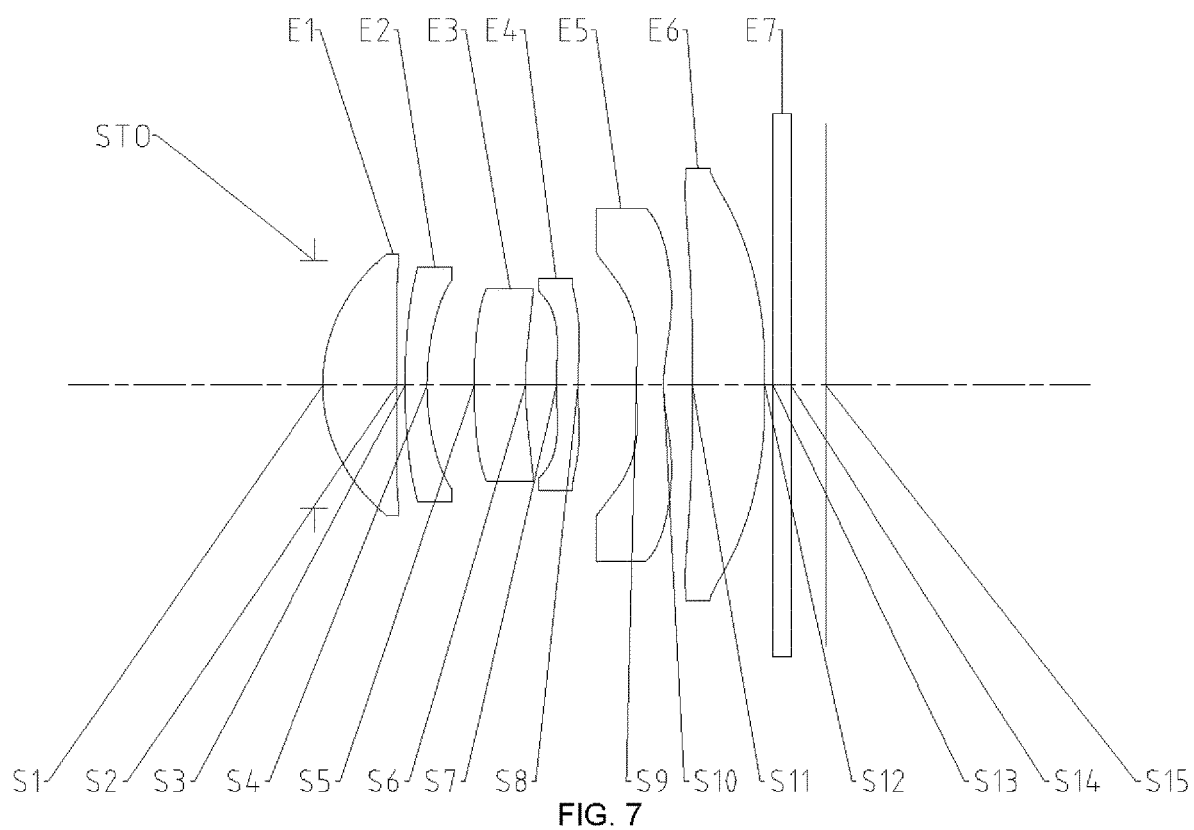
FIG. 7 is a schematic view showing a structure of an optical imaging lens according to Embodiment 4 of the disclosure.

An optical imaging lens according to Embodiment 4 of the disclosure is described below with reference to FIGS. 7 to 8D. FIG. 7 is a schematic view showing a structure of an optical imaging lens according to Embodiment 4 of the disclosure.

As shown in FIG. 7, the optical imaging lens includes sequentially from an object side to an image side along an optical axis: a diaphragm STO, a first lens E1, a second lens E2, a third lens E3, a fourth lens E4, a fifth lens E5, a sixth lens E6, and an optical filter E7.

The first lens E1 has a positive refractive power, an object side surface-S1 of the first lens is a convex surface and an image side surface S2 of the first lens is a convex surface. The second lens E2 has a negative refractive power, an object side surface S3 of the second lens is a convex surface and an image side surface S4 of the second lens is a concave surface. The third lens E3 has a negative refractive power, an object side surface S5 of the third lens is a convex surface and an image side surface S6 of the third lens is a concave surface. The fourth lens E4 has a negative refractive power, an object side surface S7 of the fourth lens is a convex surface and an image side surface S8 of the fourth lens is a concave surface. The fifth lens E5 has a negative refractive power, an object side surface S9 of the fifth lens is a convex surface and an image side surface S10 of the fifth lens is a concave surface. The sixth lens E6 has a positive refractive power, an object side surface S11 of the sixth lens is a convex surface and an image side surface S12 of the sixth lens is a convex surface. The filter E7 has an object side S13 and an image side S14. The optical imaging lens has an imaging surface S15 through, light from an object passes through S1 to S14 sequentially and is finally imaged at the imaging surface S15.

In this embodiment, the value of the total effective focal length f of the optical imaging lens is 6.13 mm, the value of the on-axis distance TTL from the object side SI of the first lens EI to the imaging surface S15 is 5.94 mm, and the value of the half of the diagonal length ImgH of the effective pixel area on the imaging surface S15 is 3.07 mm.

Table 7 shows a basic parameter table of the optical imaging lens of Embodiment 4, wherein the units of radius of curvature, thickness/distance, and focal length are millimeters (mm). Table 8 shows higher order term coefficients that can be used for each aspherical mirror in Embodiment 4, wherein each aspherical surface type can be defined by Equation (1) given in Embodiment 1 above.

TABLE 7

| Surface number | Surface type | Radius of curvature | Thickness/ Distance | Materials | | Focal length | Conic coefficient |
|---|---|---|---|---|---|---|---|
| | | | | Refractive Index | Abbe number | | |
| OBJ | Spherical | Infinity | Infinity | | | | |
| STO | Spherical | Infinity | 0.1000 | | | | |
| S1 | Aspheric | 1.9042 | 0.8703 | 1.55 | 56.1 | 3.34 | 0.0588 |
| S2 | Aspheric | −35.5909 | 0.1000 | | | | |
| S3 | Aspheric | 7.3528 | 0.2598 | 1.68 | 19.2 | −7.96 | −12.1690 |
| S4 | Aspheric | 3.0674 | 0.5538 | | | | 0.0000 |
| S5 | Aspheric | 6.1984 | 0.6038 | 1.54 | 55.7 | −22.05 | 6.7955 |
| S6 | Aspheric | 3.9307 | 0.3659 | | | | 0.0000 |
| S7 | Aspheric | 5.4796 | 0.2537 | 1.67 | 20.4 | −1000.35 | 0.0000 |
| S8 | Aspheric | 5.3343 | 0.6943 | | | | 0.0000 |
| S9 | Aspheric | 4.3239 | 0.3188 | 1.54 | 55.7 | −5.94 | 0.0000 |
| S10 | Aspheric | 1.7893 | 0.3416 | | | | −1.0000 |
| S11 | Aspheric | 23.1951 | 0.8507 | 1.68 | 19.2 | 29.69 | 0.0000 |
| S12 | Aspheric | −149.5133 | 0.1000 | | | | 0.0000 |
| S13 | Spherical | Infinity | 0.2100 | 1.52 | 64.2 | | |
| S14 | Spherical | Infinity | 0.4133 | | | | |
| S15 | Spherical | Infinity | | | | | |

TABLE 8

| Surface number. | A4 | A6 | A8 | A10 | A12 | A14 | A16 | A18 | A20 |
|---|---|---|---|---|---|---|---|---|---|
| S1 | −3.0735E−03 | 8.3886E−04 | −3.2023E−04 | −1.0327E−02 | 2.0588E−02 | −1.8170E−02 | 8.3710E−03 | −1.9391E−03 | 1.7522E−04 |
| S2 | 3.6958E−02 | −5.2383E−02 | 3.1650E−02 | 4.5186E−02 | −9.7604E−02 | 7.8565E−02 | −3.2874E−02 | 7.0414E−03 | −6.0868E−04 |
| S3 | 9.4064E−03 | −1.4991E−02 | −9.9441E−02 | 4.0224E−01 | −6.2289E−01 | 5.2336E−01 | −2.5138E−01 | 6.4845E−02 | −6.9718E−03 |
| S4 | −2.5637E−02 | 7.5971E−02 | −3.1562E−01 | 9.0513E−01 | −1.4242E+00 | 1.3217E+00 | −7.2196E−01 | 2.1415E−01 | −2.6555E−02 |
| S5 | −1.3310E−02 | −1.8749E−02 | 2.1210E−01 | −5.4697E−01 | 8.8032E−01 | −8.8833E−01 | 5.4579E−01 | −1.8657E−01 | 2.7226E−02 |
| S6 | −7.4375E−02 | 5.7982E−02 | −1.0353E−01 | 2.4048E−01 | −3.5628E−01 | 3.0253E−01 | −1.4123E−01 | 2.9003E−02 | −7.4258E−04 |
| S7 | −2.0302E−01 | −5.3386E−02 | 1.9761E−01 | −4.7252E−01 | 6.8518E−01 | −5.2400E−01 | 1.1995E−01 | 6.3379E−02 | −2.7946E−02 |
| S8 | −1.7217E−01 | 4.0416E−02 | −3.5664E−02 | 9.5485E−02 | −9.0377E−02 | 4.5832E−02 | −1.9117E−02 | 9.7436E−03 | −2.4083E−03 |
| S9 | −3.9048E−01 | 3.4705E−01 | 1.6512E−01 | −2.1423E+00 | 5.0690E+00 | −6.4324E+00 | 4.7302E+00 | −1.6231E+00 | −3.5606E−01 |
| S10 | −4.3315E−01 | 6.4160E−01 | −7.6647E−01 | 4.8648E−01 | 6.8963E−02 | −4.5510E−01 | 4.6918E−01 | −2.8042E−01 | 1.1128E−01 |
| S11 | −1.2059E−01 | 1.3991E−01 | 1.5745E−02 | −2.2665E−01 | 3.0161E−01 | −2.2698E−01 | 1.1425E−01 | −4.0524E−02 | 1.0285E−02 |
| S12 | −1.3622E−01 | 1.5364E−01 | −1.8494E−01 | 2.1387E−01 | −1.8693E−01 | 1.1493E−01 | −4.9824E−02 | 1.5388E−02 | −3.3947E−03 |

Figure 8A:
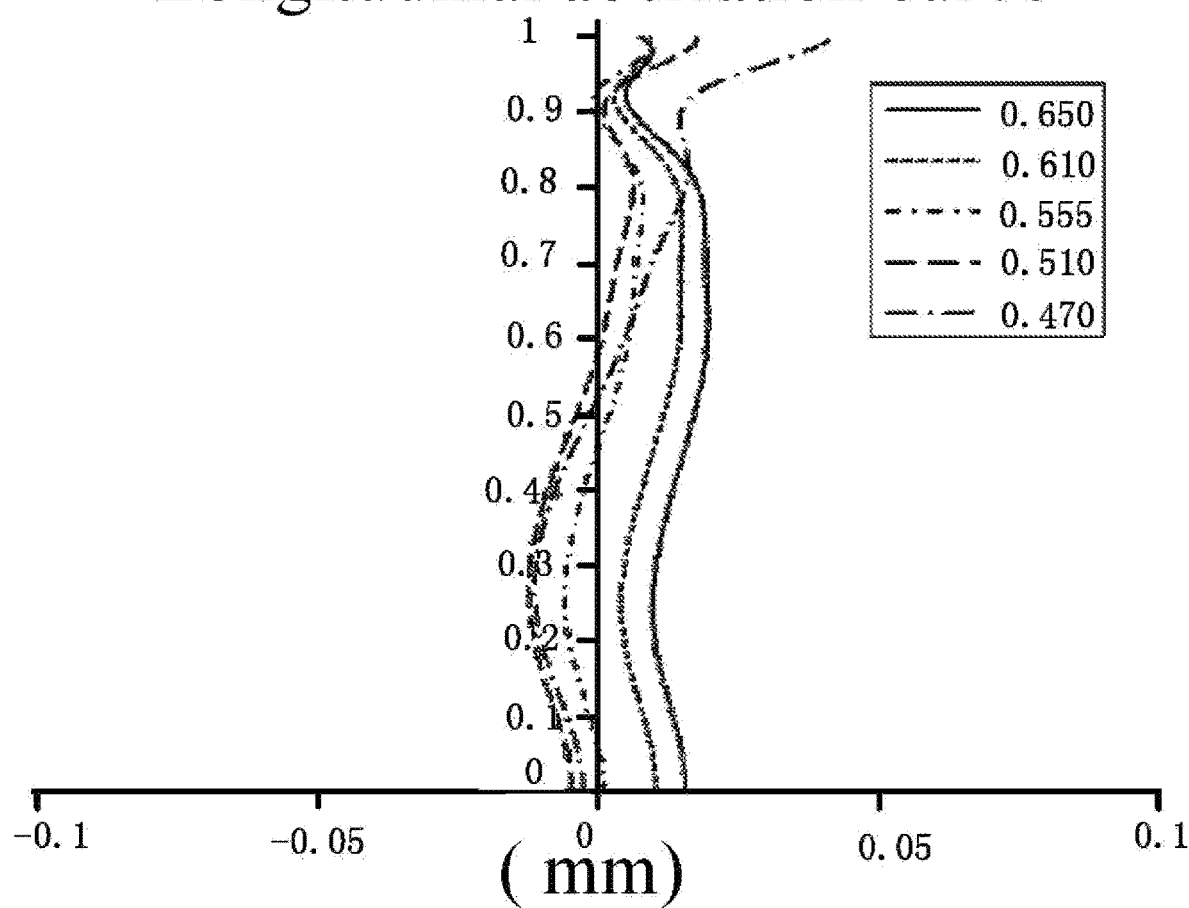
FIGS. 8A to 8D show a longitudinal aberration curve, an astigmatism curve, a distortion curve and a lateral color curve of the optical imaging lens of Embodiment 4, respectively.
Figure 8B:
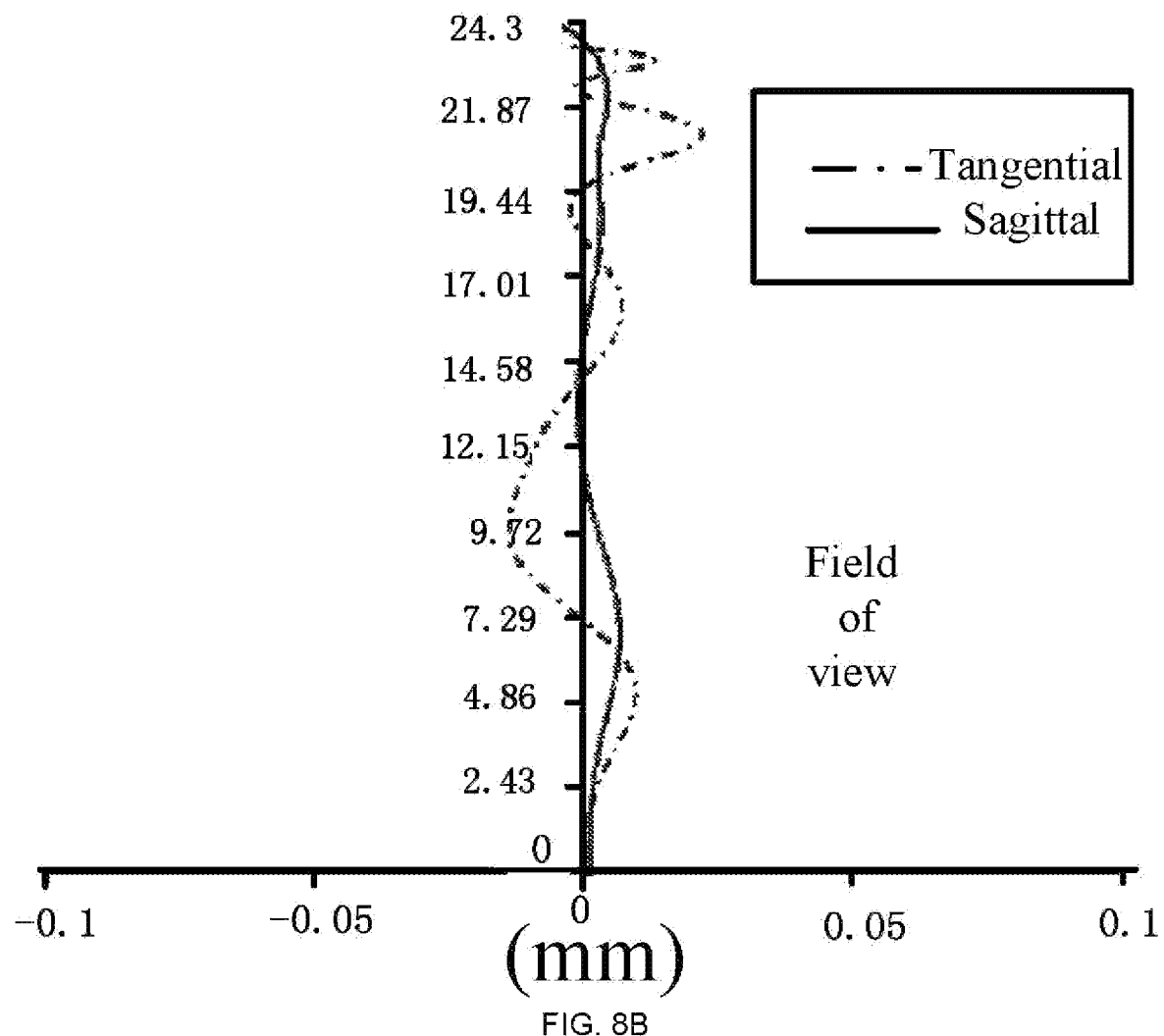
Figure 8C:
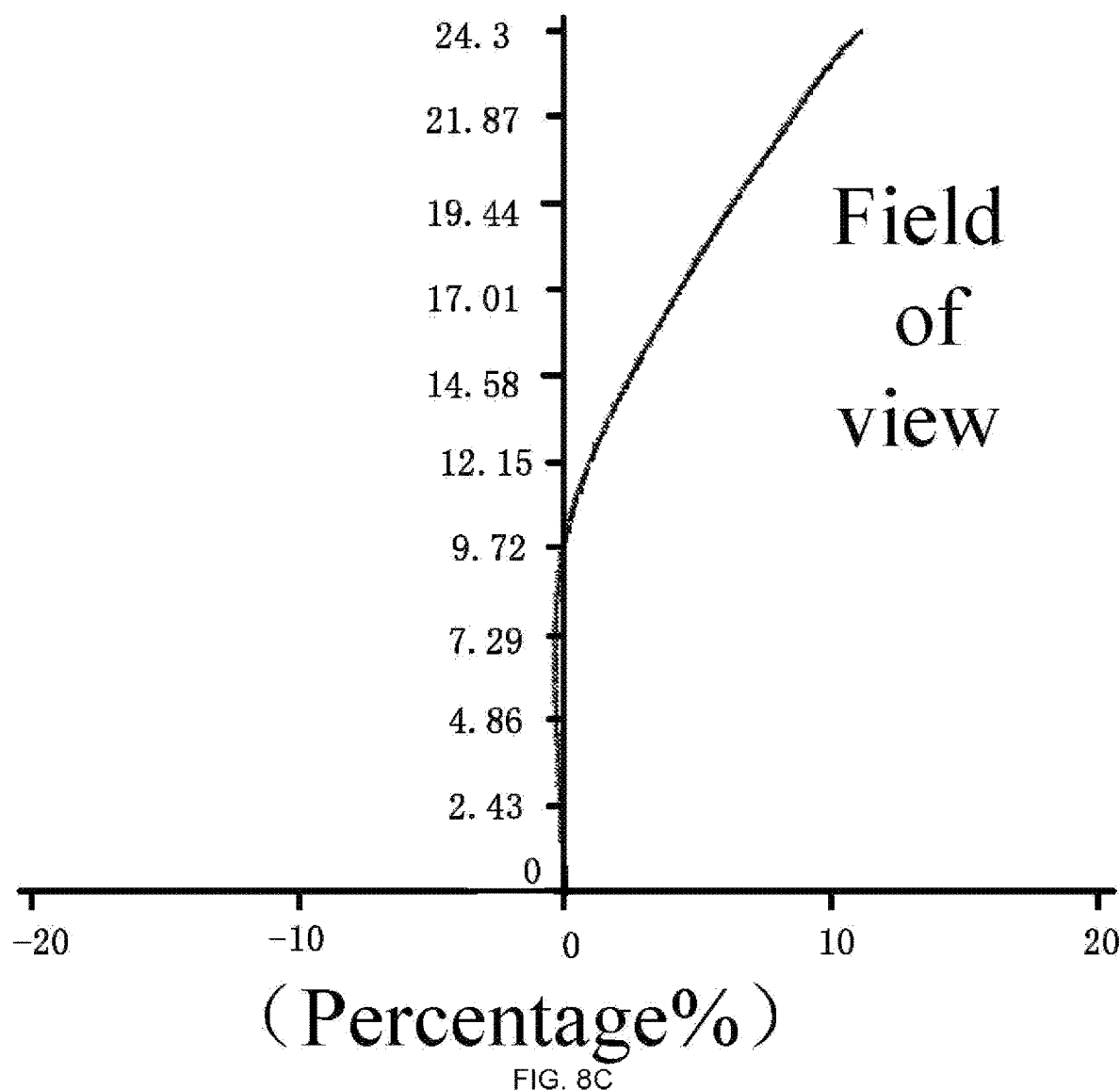
Figure 8D:
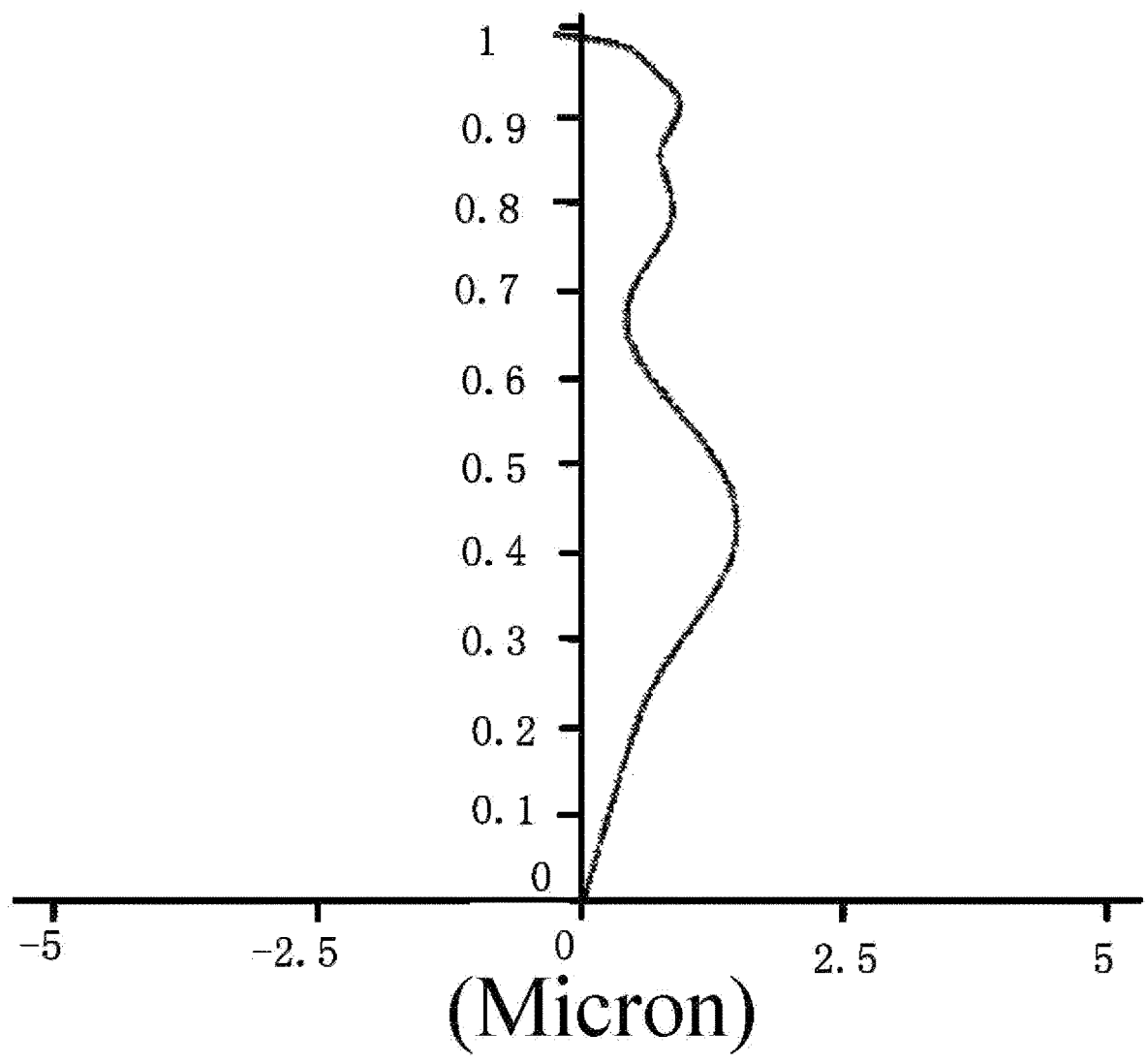

FIG. 8A shows a longitudinal aberration curve of the optical imaging lens of Embodiment 4, which indicates the deviations of light of different wavelengths from a convergent focus point after passing through the lens. FIG. 8B shows an astigmatic curve of the optical imaging lens of Embodiment 4, which indicates a tangential image plane curvature and an sagittal image plane curvature. FIG. 8C shows a distortion curve of the optical imaging lens of Embodiment 4, which indicates a distortion value under different viewing angles. FIG. 8D shows the lateral color curve of the optical imaging lens of Embodiment 4, which indicates the deviation of different image heights on the imaging surface of light passing through the lens. It can be seen from FIGS. 8A to 8D that, the optical imaging lens provided in Embodiment 4 can achieve good imaging quality.

Embodiment 5

Figure 9:
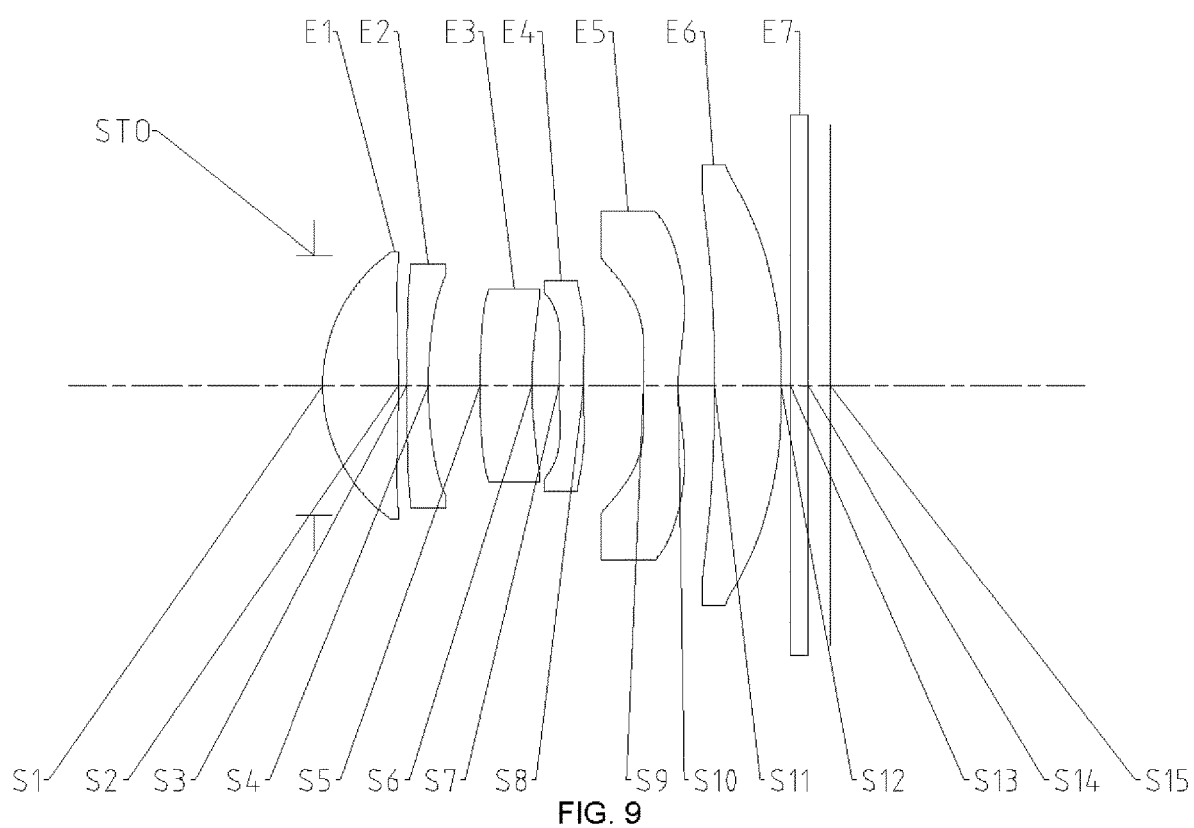
FIG. 9 is a schematic view showing a structure of an optical imaging lens according to Embodiment 5 of the disclosure.

An optical imaging lens according to Embodiment 5 of the disclosure is described below with reference to FIGS. 9 to 10D. FIG. 9 is a schematic view showing a structure of an optical imaging lens according to Embodiment 5 of the disclosure.

As shown in FIG. 9, the optical imaging lens includes sequentially from an object side to an image side along an optical axis: a diaphragm STO, a first lens E1, a second lens E2, a third lens E3, a fourth lens E4, a fifth lens E5, a sixth lens E8, and an optical filter E7.

The first lens E1 has a positive refractive power, an object side surface S1 of the first lens is a convex surface and an image side surface S2 of the first lens is a convex surface. The second lens E2 has a negative refractive power, an object side surface S3 of the second lens is a convex surface and an image side surface S4 of the second lens is a concave surface. The third lens E3 has a negative refractive power, an object side surface S5 of the third lens is a convex surface and an image side surface S6 of the third lens is a concave surface. The fourth lens E4 has a positive refractive power, an object side surface S7 of the fourth lens is a convex surface and an image side surface S8 of the fourth lens is a concave surface. The fifth lens E5 has a negative refractive power, an object side surface S9 of the fifth lens is a convex surface and an image side surface S10 of the fifth lens is a concave surface. The sixth lens E6 has a positive refractive power, an object side surface S11 of the sixth lens is a convex surface and an image side surface S12 of the sixth lens is a convex surface. The filter E7 has an object side S13 and an image side S14. The optical imaging lens has an imaging surface S15 through, light from an object passes through S1 to S14 sequentially and is finally imaged at the imaging surface S15.

In this embodiment, the value of the total effective focal length f of the optical imaging lens is 6.12 mm, the value of the on-axis distance TTL from the object side SI of the first lens EI to the imaging surface S15 is 5.98 mm, and the value of the half of the diagonal length ImgH of the effective pixel area on the imaging surface S15 is 3.07 mm.

Table 9 shows a basic parameter table of the optical imaging lens of Embodiment 5, wherein, the units of radius of curvature, thickness/distance, and focal length are millimeters (mm). Table 10 shows higher order term coefficients that can be used for each aspherical mirror in Embodiment 5, wherein each aspherical surface type can be defined by Equation (1) given in Embodiment 1 above.

TABLE 9

| Surface number | Surface type | Radius of curvature | Thickness/ Distance | Materials | | Focal length | Conic coefficient |
| | | | | Refractive Index | Abbe number | | |
|---|---|---|---|---|---|---|---|
| OBJ | Spherical | Infinity | Infinity | | | | |
| STO | Spherical | Infinity | 0.1000 | | | | |
| S1 | Aspheric | 1.9490 | 0.8907 | 1.55 | 56.1 | 3.27 | 0.0910 |
| S2 | Aspheric | −17.5716 | 0.1000 | | | | 100.0000 |
| S3 | Aspheric | 33.0756 | 0.2531 | 1.68 | 19.2 | −8.56 | −137.5802 |
| S4 | Aspheric | 4.9187 | 0.6089 | | | | 0.0000 |
| S5 | Aspheric | 9.4493 | 0.6102 | 1.54 | 55.7 | −13.29 | 31.4689 |
| S6 | Aspheric | 3.9755 | 0.3189 | | | | 0.0000 |
| S7 | Aspheric | 5.1142 | 0.2929 | 1.67 | 20.4 | 59.94 | 0.0000 |
| S8 | Aspheric | 5.7298 | 0.7122 | | | | 0.0000 |
| S9 | Aspheric | 5.4922 | 0.4073 | 1.54 | 55.7 | −6.01 | 0.0000 |
| S10 | Aspheric | 1.9817 | 0.4255 | | | | −1.0000 |
| S11 | Aspheric | 51.2933 | 0.7845 | 1.68 | 19.2 | 47.28 | 0.0000 |

TABLE 9-continued

| Surface number | Surface type | Radius of curvature | Thickness/ Distance | Materials | | Focal length | Conic coefficient |
| --- | --- | --- | --- | --- | --- | --- | --- |
| | | | | Refractive Index | Abbe number | | |
| S12 | Aspheric | −84.7835 | 0.1098 | | | | 0.0000 |
| S13 | Spherical | Infinity | 0.2100 | 1.52 | 64.2 | | |
| S14 | Spherical | Infinity | 0.2600 | | | | |
| S15 | Spherical | Infinity | | | | | |

TABLE 10

| Surface number. | A4 | A6 | A8 | A10 | A12 | A14 | A16 | A18 | A20 |
| --- | --- | --- | --- | --- | --- | --- | --- | --- | --- |
| S1 | −2.9087E−03 | −2.0688E−03 | 8.8584E−03 | −2.4016E−02 | 3.2212E−02 | −2.4094E−02 | 1.0180E−02 | −2.2460E−03 | 1.9905E−04 |
| S2 | 2.4747E−02 | −2.8414E−03 | −7.7278E−02 | 1.9464E−01 | −2.2635E−01 | 1.4838E−01 | −5.5807E−02 | 1.1177E−02 | −9.2169E−04 |
| S3 | −1.2248E−03 | 2.2551E−02 | −1.6669E−01 | 4.2676E−01 | −5.4662E−01 | 4.0143E−01 | −1.7142E−01 | 3.9485E−02 | −3.7897E−03 |
| S4 | −1.9833E−02 | 5.1692E−02 | −1.8888E−01 | 4.7644E−01 | −6.5938E−01 | 5.3821E−01 | −2.5857E−01 | 6.7461E−02 | −7.3578E−03 |
| S5 | −1.0809E−02 | −1.3721E−02 | 1.3989E−01 | −3.2508E−01 | 4.7150E−01 | −4.2876E−01 | 2.3740E−01 | −7.3132E−02 | 9.6169E−02 |
| S6 | −7.1208E−02 | 5.4319E−02 | −9.4906E−02 | 2.1570E−01 | −3.1269E−01 | 2.5980E−01 | −1.1867E−01 | 2.3846E−02 | −5.9740E−04 |
| S7 | −1.8671E−01 | −4.7085E−02 | 1.6715E−01 | −3.8328E−01 | 5.3299E−01 | −3.9090E−01 | 8.5814E−02 | 4.3483E−02 | −1.8387E−02 |
| S8 | −1.6111E−01 | 3.6584E−02 | −3.1228E−02 | 8.0878E−02 | −7.4051E−02 | 3.6326E−02 | −1.4657E−02 | 7.2265E−03 | −1.7279E−03 |
| S9 | −3.8636E−01 | 3.4157E−01 | 1.6165E−01 | −2.0863E+00 | 4.9103E+00 | −6.1981E+00 | 4.5338E+00 | −1.5474E+00 | −3.3768E−01 |
| S10 | −4.1993E−01 | 6.1245E−01 | −7.2040E−01 | 4.5021E−01 | 6.2839E−01 | −4.0832E−01 | 4.1447E−01 | −2.4391E−01 | 9.5301E−02 |
| S11 | −1.0646E−01 | 1.1606E−01 | 1.2272E−02 | −1.6599E−01 | 2.0754E−01 | −1.4675E−01 | 6.9409E−02 | −2.3131E−02 | 5.5162E−03 |
| S12 | −1.1571E−01 | 1.2029E−01 | −1.3345E−01 | 1.4224E−01 | −1.1458E−01 | 6.4930E−02 | −2.5943E−02 | 7.3845E−03 | −1.5015E−03 |

Figure 10A:
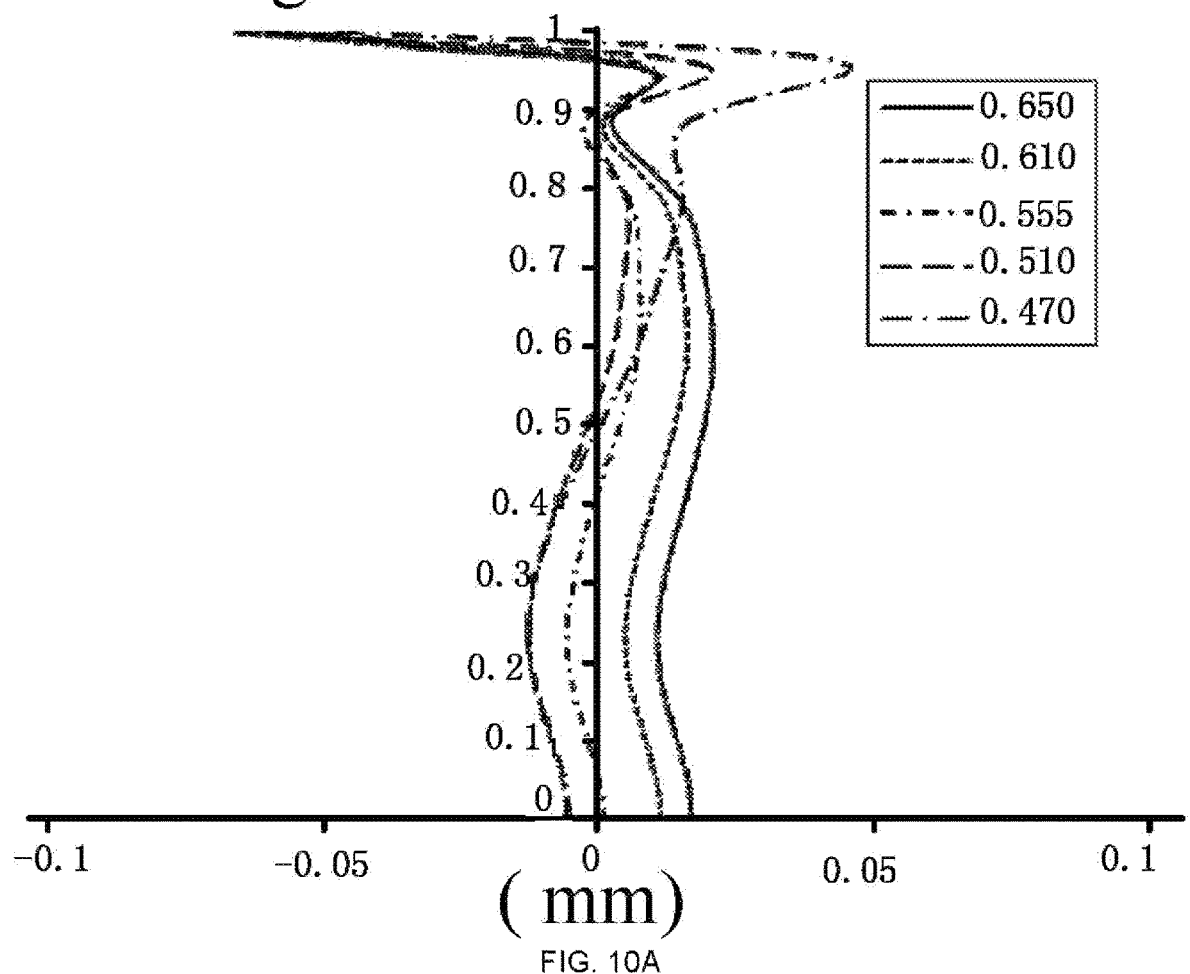
FIGS. 10A to 10D show a longitudinal aberration curve, an astigmatism curve, a distortion curve, and a lateral color curve, respectively, of the optical imaging lens of Embodiment 5.
Figure 10B:
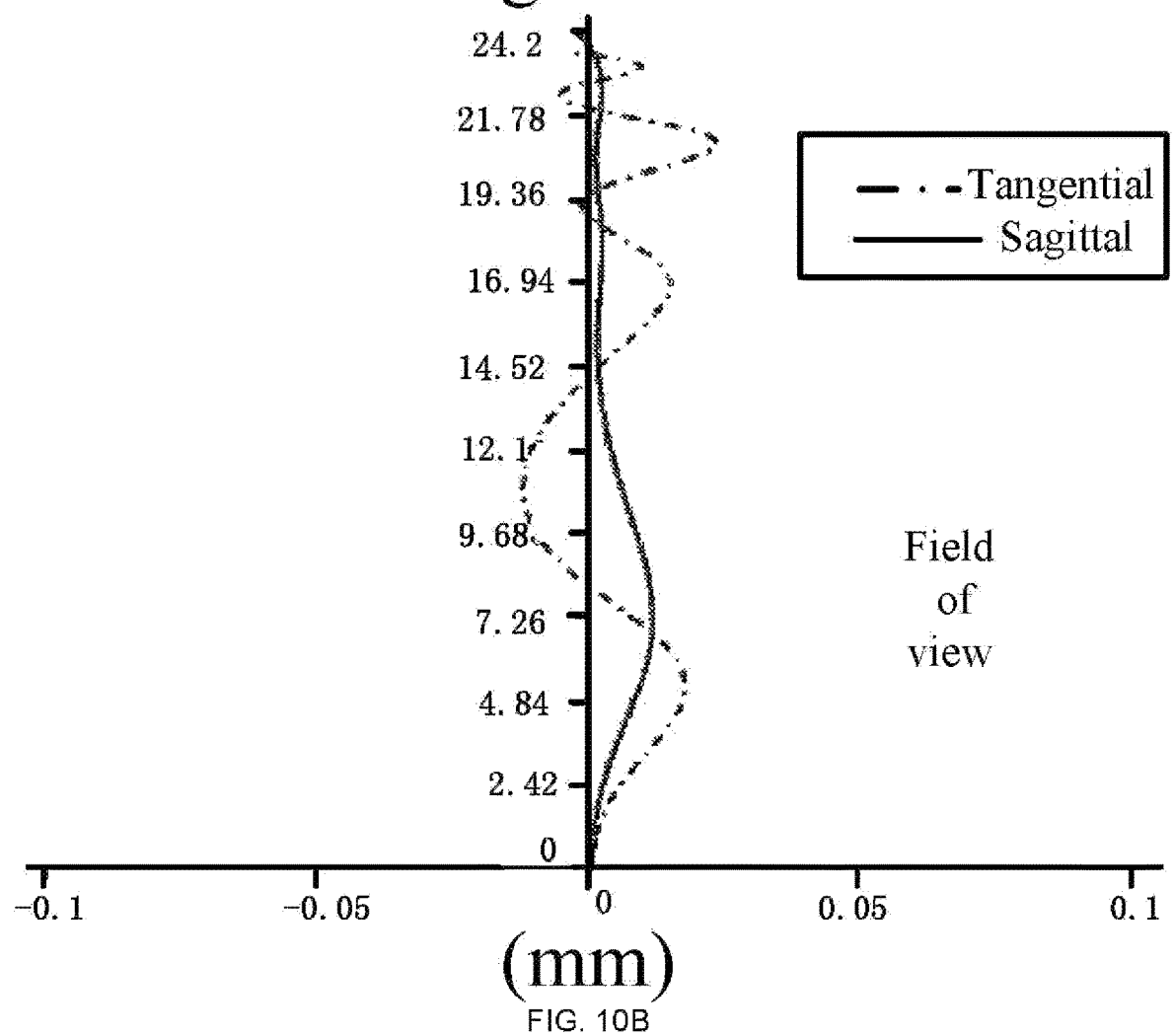
Figure 10C:
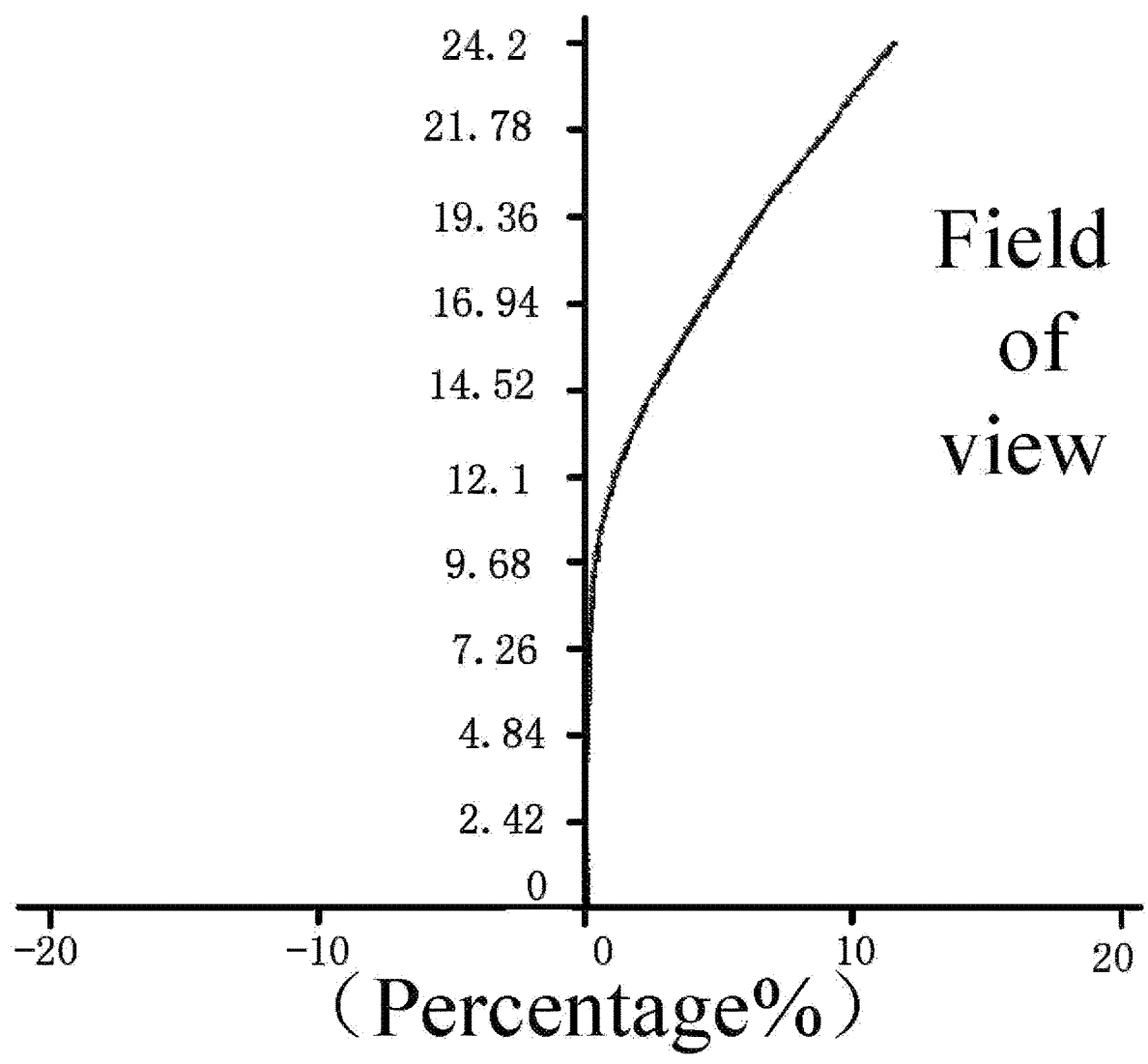
Figure 10D:
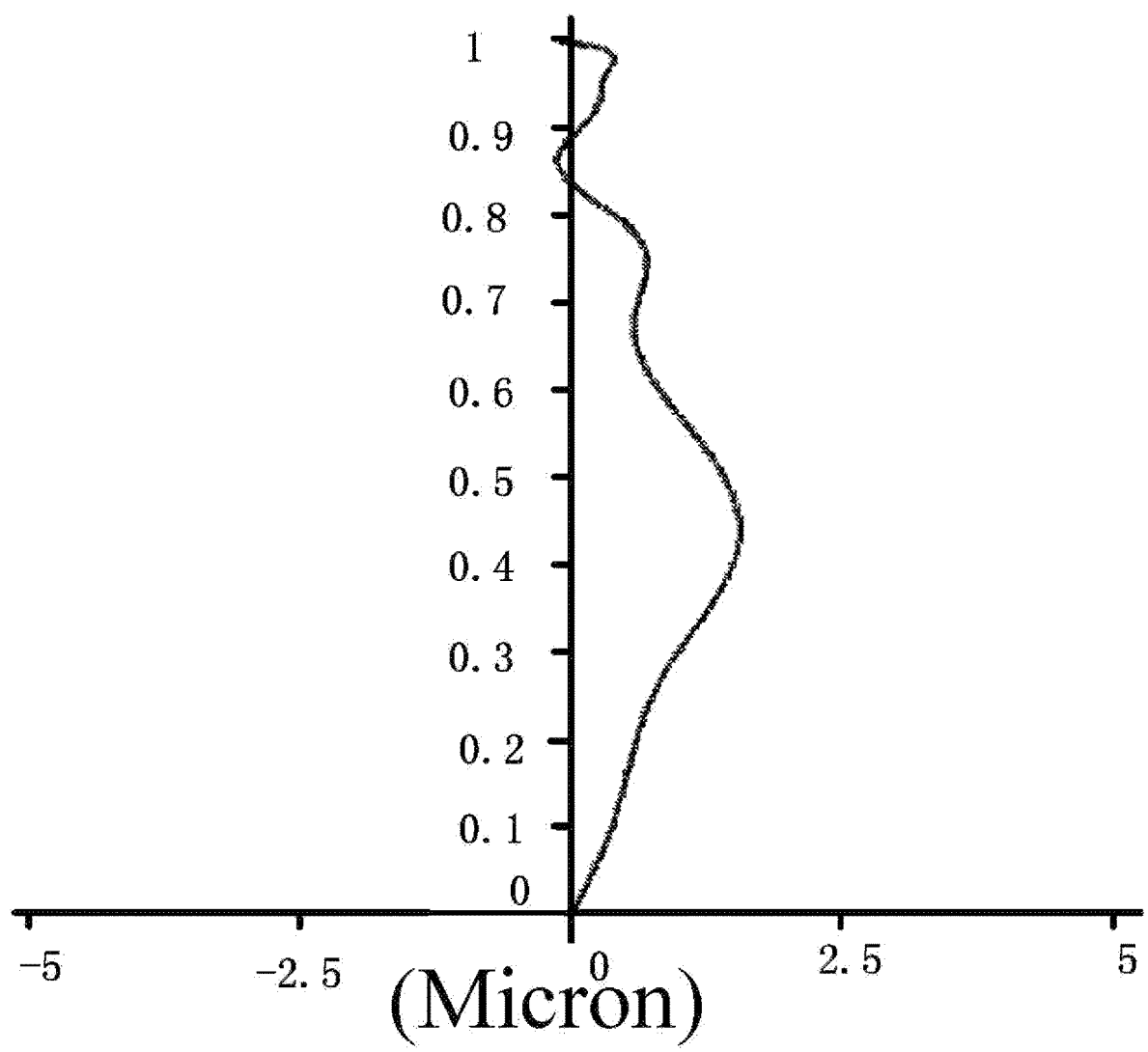

FIG. 10A shows a longitudinal aberration curve of the optical imaging lens of Embodiment 5, which indicates the deviations of light of different wavelengths from a convergent focus point after passing through the lens. FIG. 10B shows an astigmatic curve of the optical imaging lens of Embodiment 5, which indicates a tangential image plane curvature and an sagittal image plane curvature. FIG. 10C shows a distortion curve of the optical imaging lens of Embodiment 5, which indicates a distortion value under different viewing angles. FIG. 10D shows the lateral color curve of the optical imaging lens of Embodiment 5, which indicates the deviation of different image heights on the imaging surface of light passing through the lens. It can be seen from FIGS. 10A to 10D that, the optical imaging lens provided in Embodiment 5 can achieve good imaging quality.

Embodiment 6

Figure 11:
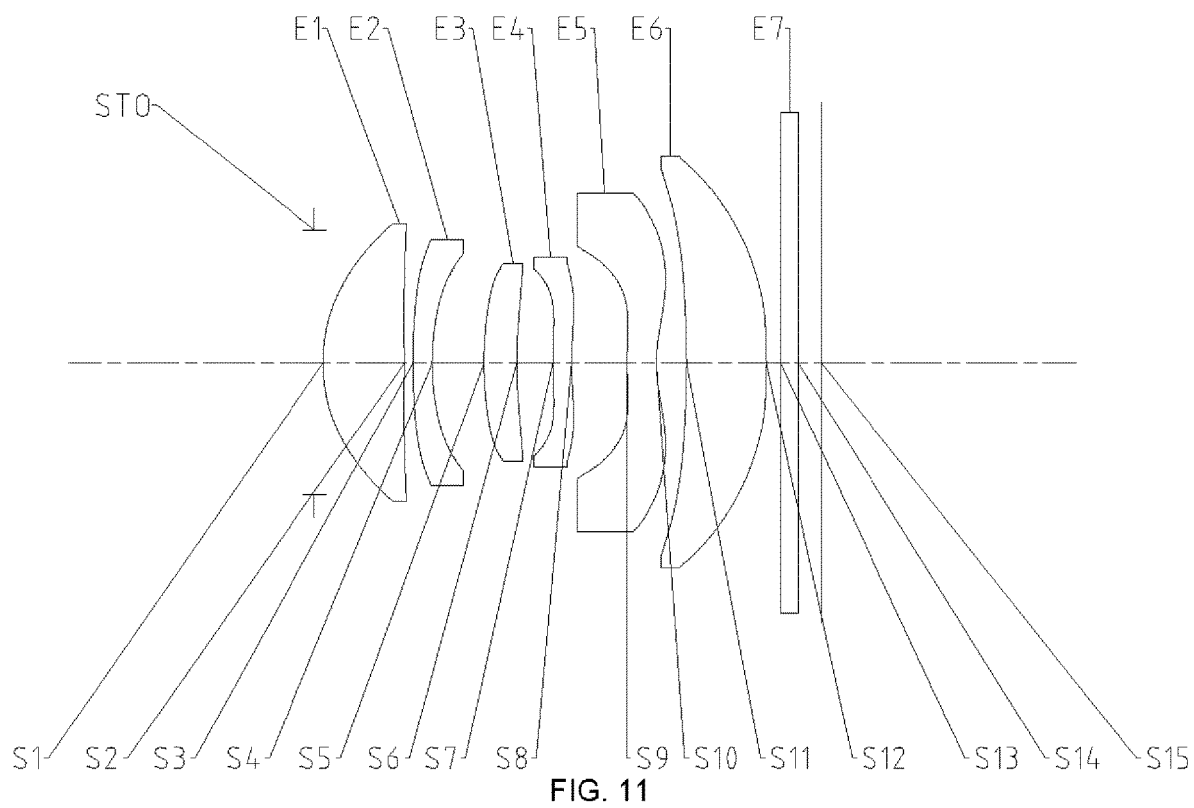
FIG. 11 is a schematic view showing a structure of an optical imaging lens according to Embodiment 6 of the disclosure.

An optical imaging lens according to Embodiment 6 of the disclosure is described below with reference to FIGS. 11 to 12D. FIG. 11 is a schematic view showing a structure of an optical imaging lens according to Embodiment 6 of the disclosure.

As shown in FIG. 11, the optical imaging lens includes sequentially from an object side to an image side along an optical axis: a diaphragm STO, a first lens E1, a second lens E2, a third lens E3, a fourth lens E4, a fifth lens E5, a sixth lens E6, and an optical filter E7.

The first lens E1 has a positive refractive power, an object side-surface S1 of the first lens is a convex surface and an image side surface S2 of the first lens is a convex surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third lens is a concave surface. The fourth lens E4 has a negative refractive power, an object side surface S7 of the fourth lens is a convex surface and an image side surface S8 of the fourth lens is a concave surface. The fifth lens E5 has a negative refractive power, an object side surface S9 of the fifth lens is a convex surface and an image side surface S10 of the fifth lens is a concave surface. The sixth lens E6 has a positive refractive power, an object side surface S11 of the sixth lens is a concave surface and an image side surface S12 of the sixth lens is a convex surface. The filter ET has an object side S13 and an image side S14. The optical imaging lens has an imaging surface S15 through, light from an object passes through S1 to S14 sequentially and is finally imaged at the imaging surface S15.

In this embodiment, the value of the total effective focal length f of the optical imaging lens is 6.36 mm, the value of the on-axis distance TTL from the object side S1 of the first lens E1 to the imaging surface S5 is 6.88 mm, and the value of the half of the diagonal length ImgH of the effective pixel area on the imaging surface S15 is 3.07 mm.

Table 11 shows a basic parameter table of the optical imaging lens of Embodiment 6, wherein, the units of radius of curvature, thickness/distance, and focal length are millimeters (mm). Table 12 shows higher order term coefficients that can be used for each aspherical mirror in Embodiment 6, wherein each aspherical surface type can be defined by Equation (1) given in Embodiment 1 above.

TABLE 11

| Surface number | Surface type | Radius of curvature | Thickness/ Distance | Materials Refractive Index | Abbe number | Focal length | Conic coefficient |
|---|---|---|---|---|---|---|---|
| OBJ | Spherical | Infinity | Infinity | | | | |
| STO | Spherical | Infinity | 0.1000 | | | | |
| S1 | Aspheric | 1.8837 | 0.9608 | 1.55 | 56.1 | 3.29 | 0.0075 |
| S2 | Aspheric | −32.0480 | 0.1000 | | | | 0.0000 |
| S3 | Aspheric | 7.8856 | 0.2262 | 1.68 | 19.2 | −6.89 | 0.3070 |
| S4 | Aspheric | 2.8972 | 0.6092 | | | | 0.3372 |
| S5 | Aspheric | 4.2336 | 0.3850 | 1.54 | 55.7 | 56.13 | −0.8135 |
| S6 | Aspheric | 4.7684 | 0.4256 | | | | 2.8542 |
| S7 | Aspheric | 5.2397 | 0.2200 | 1.67 | 20.4 | −20.09 | 7.7786 |
| S8 | Aspheric | 3.7039 | 0.6606 | | | | −6.5126 |
| S9 | Aspheric | 4.2036 | 0.3439 | 1.54 | 55.7 | −5.45 | −38.8065 |
| S10 | Aspheric | 1.6758 | 0.3565 | | | | −1.2399 |
| S11 | Aspheric | −25.1839 | 0.9381 | 1.68 | 19.2 | 79.07 | 100.0000 |
| S12 | Aspheric | −17.3893 | 0.1687 | | | | 29.0594 |
| S13 | Spherical | Infinity | 0.2100 | 1.52 | 64.2 | | |
| S14 | Spherical | Infinity | 0.2728 | | | | |
| S15 | Spherical | Infinity | | | | | |

TABLE 12

| Surface number. | A4 | A6 | A8 | A10 | A12 | A14 | A16 | A18 | A20 |
|---|---|---|---|---|---|---|---|---|---|
| S1 | −2.1366E−03 | −7.2298E−03 | 1.6089E−02 | −2.6799E−02 | 2.5811E−02 | −1.5433E−02 | 5.5216E−03 | −1.0938E−03 | 9.2642E−05 |
| S2 | 3.5204E−02 | −4.0216E−02 | 4.2878E−02 | −3.7886E−02 | 2.6152E−02 | −1.2889E−02 | 4.0735E−03 | −7.2060E−04 | 5.3609E−05 |
| S3 | 9.4762E−03 | −2.5574E−02 | 6.1706E−02 | −7.3564E−02 | 6.4522E−02 | −3.8319E−02 | 1.4116E−02 | −2.9314E−03 | 2.6058E−04 |
| S4 | −2.2528E−02 | 3.9169E−02 | −6.6428E−02 | 1.9075E−01 | −3.0145E−01 | 2.8523E−01 | −1.5712E−01 | 4.5640E−02 | −5.4197E−03 |
| S5 | −1.3820E−02 | 1.1974E−02 | 7.0400E−02 | −1.7371E−01 | 2.7810E−01 | −2.7245E−01 | 1.6567E−01 | −5.7782E−02 | 9.0397E−03 |
| S6 | −7.4634E−02 | 1.0859E−01 | −3.7977E−01 | 1.0333E+00 | −1.8335E+00 | 2.0644E+00 | −1.4215E+00 | 5.4671E−01 | −9.0103E−02 |
| S7 | −2.2377E−01 | −2.9950E−02 | 3.6382E−01 | −1.3117E+00 | 2.4369E+00 | −2.6888E+00 | 1.7225E+00 | −5.8324E−01 | 8.0624E−02 |
| S8 | −1.9340E−01 | 1.2681E−01 | −1.7067E−02 | 2.0172E−01 | −1.6343E−01 | 9.1782E−02 | −3.7343E−02 | 1.2746E−02 | −2.3169E−03 |
| S9 | −2.7868E−01 | −1.9666E−02 | 8.4374E−01 | −3.2960E+00 | 6.8882E+00 | −8.6864E+00 | 6.5494E+00 | −2.3275E+00 | −5.3463E−01 |
| S10 | −3.6784E−01 | 4.6713E−01 | −5.4904E−01 | 3.1669E−01 | 1.6071E−01 | −4.9752E−01 | 4.9097E−01 | −2.9189E−01 | 1.1609E−01 |
| S11 | −8.8826E−02 | 1.2156E−01 | 4.9871E−02 | −3.2788E−01 | 4.5222E−01 | −3.6121E−01 | 1.9386E−01 | −7.3401E−02 | 1.9897E−02 |
| S12 | −1.7522E−01 | 2.0105E−01 | −2.4052E−01 | 2.7951E−01 | −2.5333E−01 | 1.6365E−01 | −7.4740E−02 | 2.4312E−02 | −5.6457E−03 |

Figure 12A:
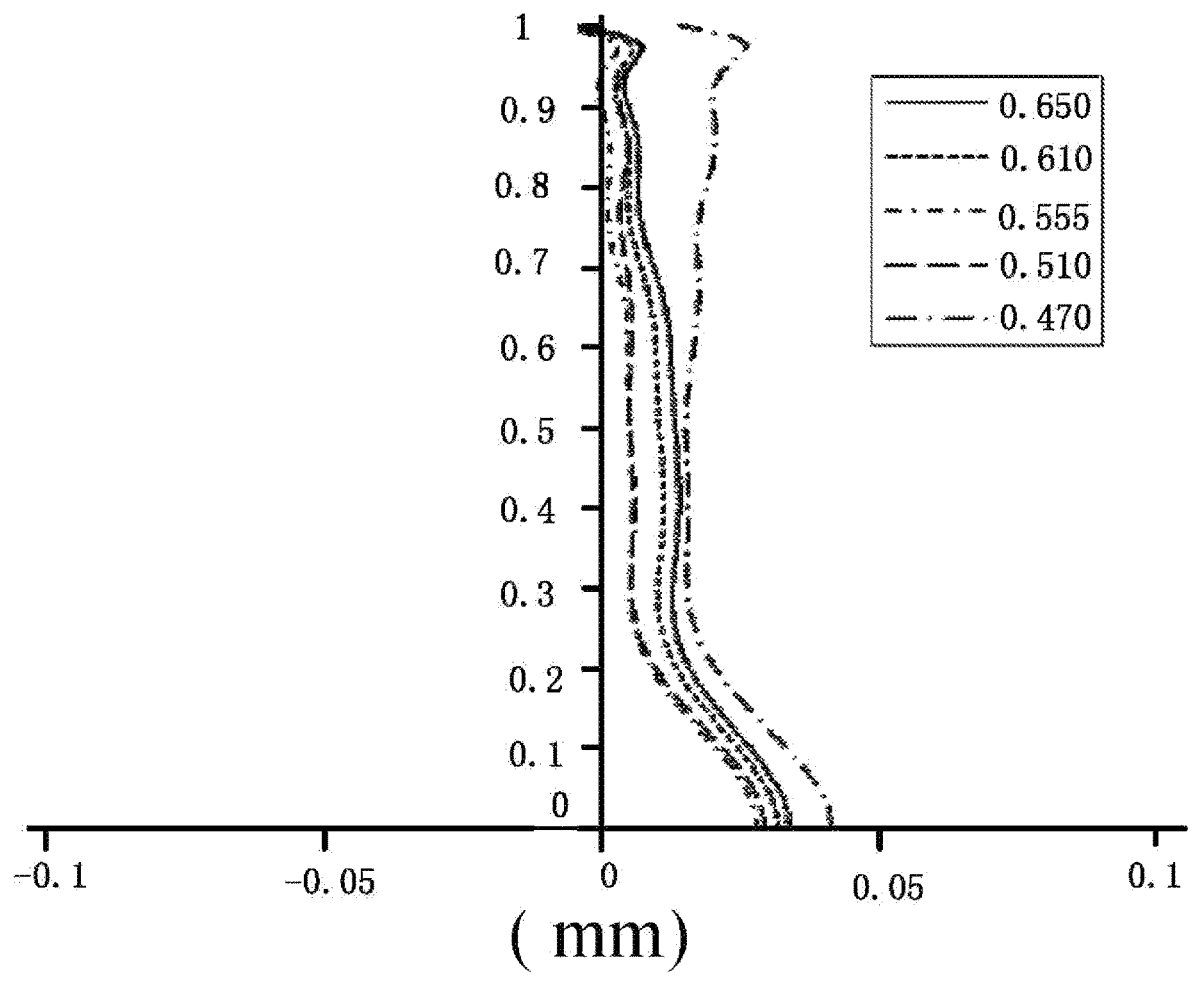
FIGS. 12A to 12D show a longitudinal aberration curve, an astigmatism curve, a distortion curve and a lateral color curve of the optical imaging lens of Embodiment 6, respectively.
Figure 12B:
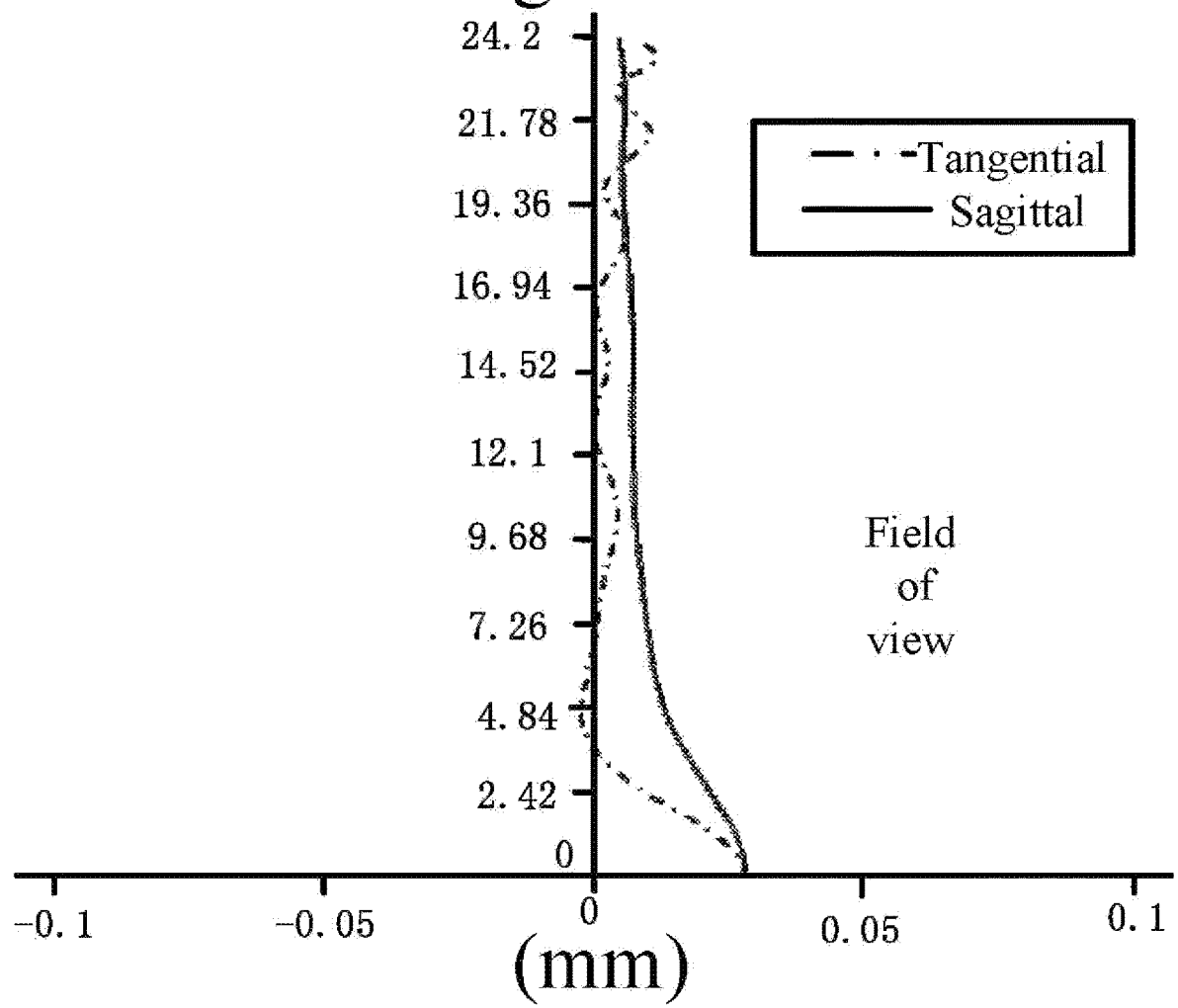
Figure 12C:
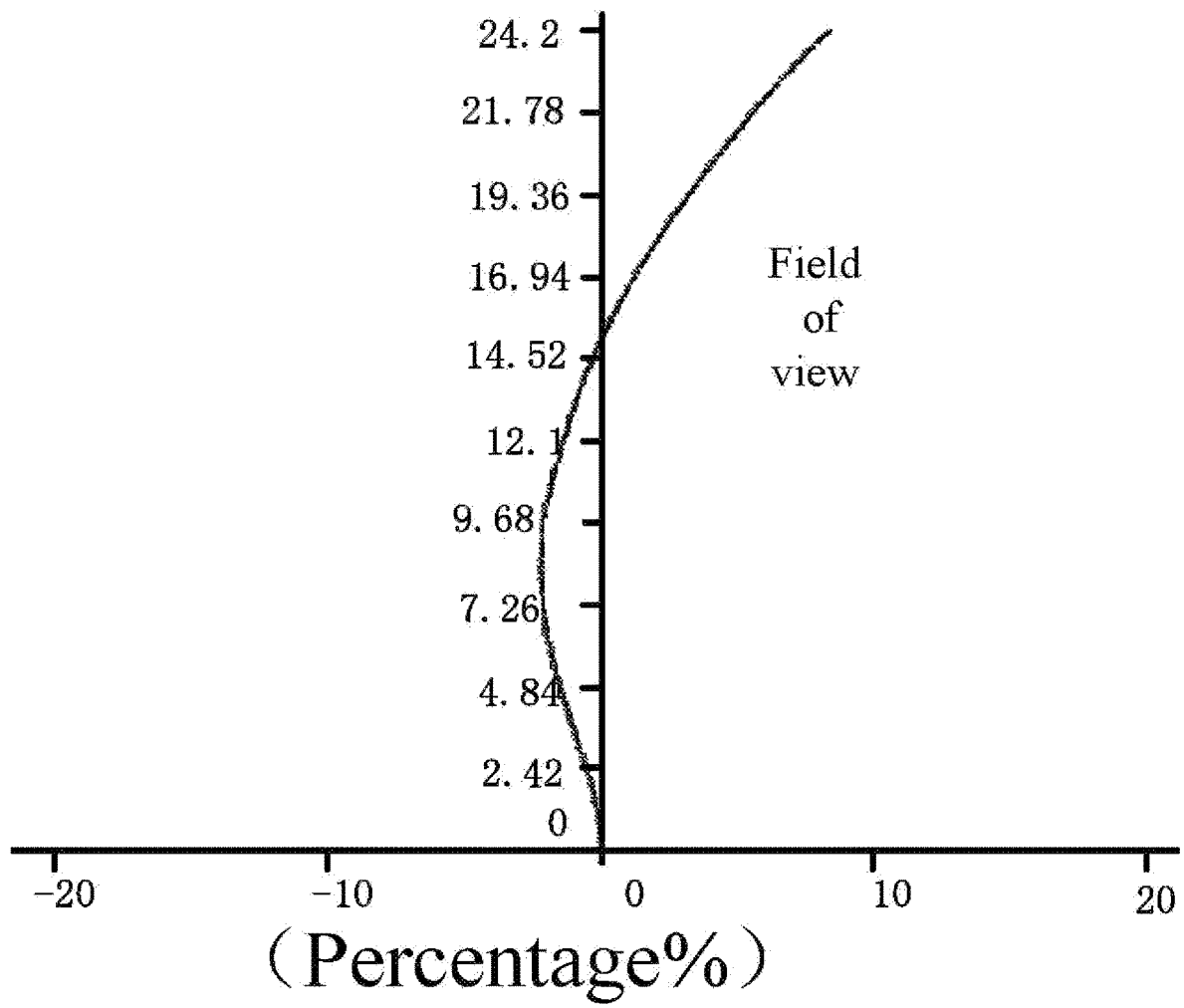
Figure 12D:
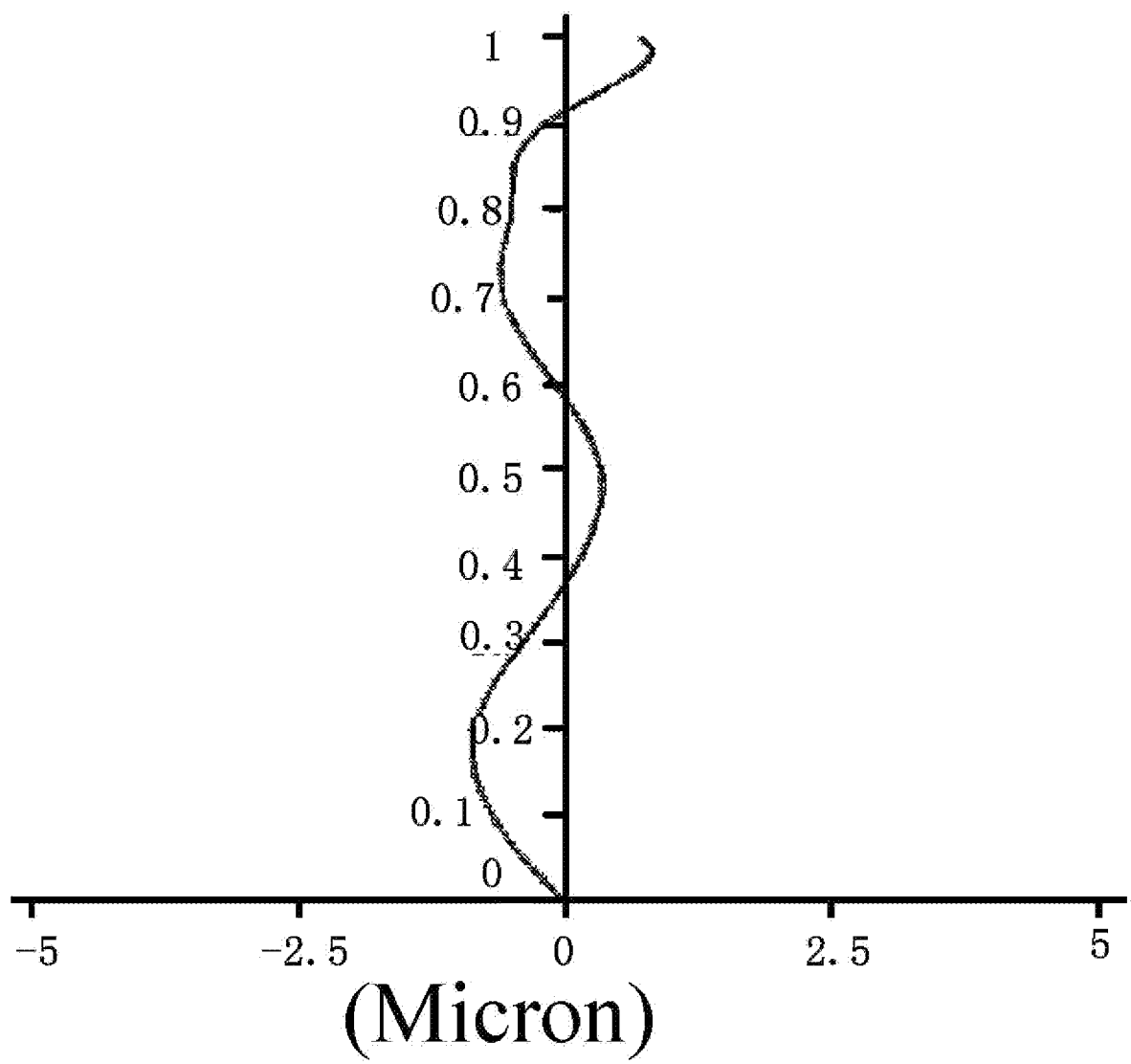

FIG. 12A shows a longitudinal aberration curve of the optical imaging lens of Embodiment 6, which indicates the deviations of light of different wavelengths from a convergent focus point after passing through the lens. FIG. 12B shows an astigmatic curve of the optical imaging lens of Embodiment 6, which indicates a tangential image plane curvature and an sagittal image plane curvature. FIG. 12C shows a distortion curve of the optical imaging lens of Embodiment 8, which indicates a distortion value under different viewing angles. FIG. 12D shows the lateral color curve of the optical imaging lens of Embodiment 6, which indicates the deviation of different image heights on the imaging surface of light passing through the lens. It can be seen from FIGS. 12A to 12D that, the optical imaging lens provided in Embodiment 6 can achieve good imaging quality.

Embodiment 7

Figure 13:
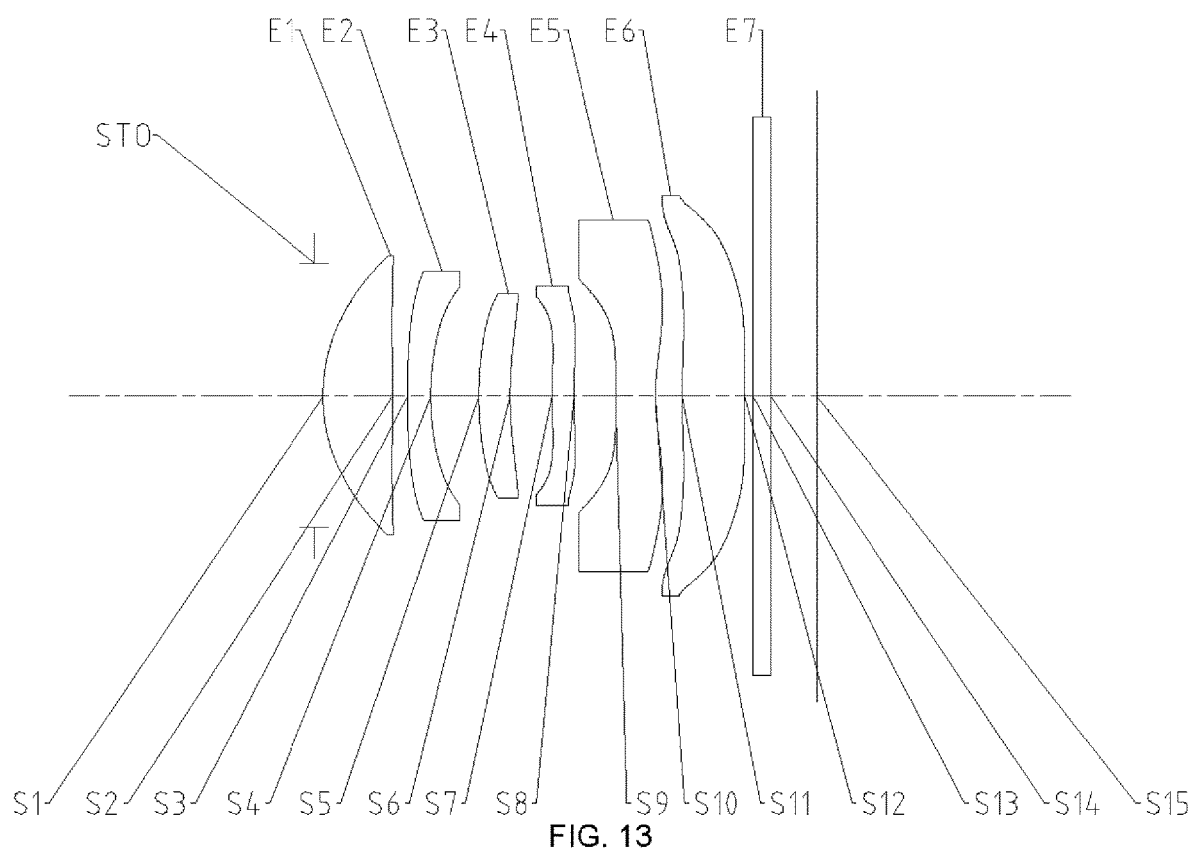
FIG. 13 is a schematic view showing the structure of an optical imaging lens according to Embodiment 7 of the disclosure.

An optical imaging lens according to Embodiment 7 of the disclosure is described below with reference to FIGS. 13 to 14D. FIG. 13 is a schematic view showing a structure of an optical imaging lens according to Embodiment 7 of the disclosure.

As shown in FIG. 13, the optical imaging lens includes sequentially from an object side to an image side along an optical axis: a diaphragm STO, a first lens E1, a second lens E2, a third lens E3, a fourth lens E4, a fifth lens E5, a sixth lens E6, and an optical filter E7.

The first lens E1 has a positive refractive power, an object side surface S1 of the first lens is a convex surface and an image side surface S2 of the first lens is a convex surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third lens is a concave surface. The fourth lens E4 has a negative refractive power, an object side surface S7 of the fourth lens is a convex surface and an image side surface S5 of the fourth lens is a concave surface. The fifth lens E5 has a negative refractive power, an object side surface S9 of the fifth lens is a convex surface and an image side surface S10 of the fifth tens is a concave surface. The sixth lens E6 has a positive refractive power, an object side surface S11 of the sixth lens is a convex surface and a an image side surface S12 of the sixth lens is a concave surface. The filter E7 has an object side S13 and an image side S14. The optical imaging lens has an imaging surface S15 through, light from an object passes through S1 to S14 sequentially and is finally imaged at the imaging surface S15.

In this embodiment, the value of the total effective focal length f of the optical imaging lens is 5.96 mm, the value of the on-axis distance TTL from the object side SI of the first lens EI to the imaging surface S15 is 5.82 mm, and the value of the half of the diagonal length ImgH of the effective pixel area on the imaging surface S15 is 3.07 mm.

Table 13 shows a basic parameter table of the optical imaging lens of Embodiment 7, wherein, the units of radius of curvature, thickness/distance, and focal length are millimeters (mm). Table 14 shows higher order term coefficients that can be used for each aspherical mirror in Embodiment 7, wherein each aspherical surface type can be defined by Equation (1) given in Embodiment 1 above.

TABLE 13

| Surface number | Surface type | Radius of curvature | Thickness/ Distance | Materials Refractive Index | Abbe number | Focal length | Conic coefficient |
|---|---|---|---|---|---|---|---|
| OBJ | Spherical | Infinity | Infinity | | | | |
| STO | Spherical | Infinity | 0.1000 | | | | |
| S1 | Aspheric | 1.9126 | 0.8168 | 1.55 | 56.1 | 3.37 | 0.0038 |
| S2 | Aspheric | −42.5253 | 0.1781 | | | | 84.4258 |
| S3 | Aspheric | 9.3557 | 0.2743 | 1.68 | 19.2 | −6.95 | −1.6964 |
| S4 | Aspheric | 3.0945 | 0.5668 | | | | 0.0345 |
| S5 | Aspheric | 3.7649 | 0.3677 | 1.54 | 55.7 | 56.85 | −1.1693 |
| S6 | Aspheric | 4.1477 | 0.4954 | | | | −0.2287 |
| S7 | Aspheric | 7.4311 | 0.2550 | 1.67 | 20.4 | −40.71 | 2.5090 |
| S8 | Aspheric | 5.7546 | 0.4984 | | | | −4.2350 |
| S9 | Aspheric | 15.7518 | 0.4689 | 1.54 | 55.7 | −4.69 | −52.4958 |
| S10 | Aspheric | 2.2547 | 0.3138 | | | | −0.9366 |
| S11 | Aspheric | 8.1087 | 0.7390 | 1.68 | 19.2 | 13.83 | −0.7350 |
| S12 | Aspheric | 57.9518 | 0.1000 | | | | 586.0182 |
| S13 | Spherical | Infinity | 0.2100 | 1.52 | 64.2 | | |
| S14 | Spherical | Infinity | 0.5407 | | | | |
| S15 | Spherical | Infinity | | | | | |

TABLE 14

| Surface number. | A4 | A6 | A8 | A10 | A12 | A14 | A16 | A18 | A20 |
|---|---|---|---|---|---|---|---|---|---|
| S1 | −32.889E−03 | −1.8921E−03 | 1.0197E−03 | −2.4784E−03 | 2.0237E−03 | −9.2193E−04 | 1.5031E−04 | 1.0313E−05 | −3.8710E−06 |
| S2 | 1.0685E−02 | −1.0617E−03 | 1.4939E−03 | −6.8306E−03 | 1.0612E−02 | −8.7818E−03 | 4.0067E−03 | −9.4084E−04 | 8.8851E−05 |
| S3 | −2.8886E−03 | 2.4095E−02 | −9.4524E−03 | −8.1090E−03 | 2.1984E−02 | −2.2252E−02 | 1.1929E−02 | −3.2520E−03 | 3.5118E−04 |
| S4 | −8.4769E−03 | 3.8063E−02 | −1.3018E−02 | 6.3745E−03 | −5.8691E−03 | 1.2965E−02 | −1.5424E−02 | 8.5060E−03 | −1.8197E−03 |
| S5 | −1.5767E−02 | 1.9948E−02 | 1.7349E−02 | −3.6853E−02 | 6.2430E−02 | −6.6557E−02 | 4.4343E−02 | −1.6586E−02 | 2.7021E−03 |
| S6 | −4.6772E−02 | 9.9672E−03 | 1.9515E−04 | −3.9586E−02 | 8.7216E−03 | −1.3478E−02 | 1.1723E−02 | −5.2610E−03 | 6.6590E−04 |
| S7 | −1.2075E−01 | −1.0167E−02 | −7.2776E−02 | 1.7444E−01 | 1.7444E−01 | −3.2441E−01 | −2.9282E−01 | 1.1962E−01 | −1.9314E−02 |
| S8 | −1.1524E−01 | 3.1495E−02 | −7.3200E−02 | 1.1610E−01 | −1.1721E−01 | 5.5348E−02 | −4.1853E−02 | 1.2960E−02 | −1.7402E−03 |
| S9 | −2.2530E−01 | −2.2504E−01 | 1.4020E+00 | −3.0437E+00 | 3.5532E+00 | −2.4081E+00 | 9.4449E−01 | −1.9789E−01 | 1.7066E−02 |
| S10 | −2.6157E−01 | 2.4522E−01 | −2.4522E−01 | 1.3690E−01 | −5.9384E−02 | 1.6977E−02 | −3.0637E−03 | 3.1723E−04 | −1.4459E−05 |
| S11 | −4.7368E−02 | 9.3267E−03 | −3.4198E−02 | 5.0118E−02 | −3.0884E−02 | 9.8963E−03 | −1.7458E−03 | 1.6179E−04 | −6.1849E−06 |
| S12 | −6.3301E−02 | 1.1208E−01 | −1.8831E−01 | 1.5260E−01 | −6.8541E−02 | 1.8281E−02 | −2.9024E−03 | 2.5407E−04 | −9.4333E−06 |

Figure 14A:
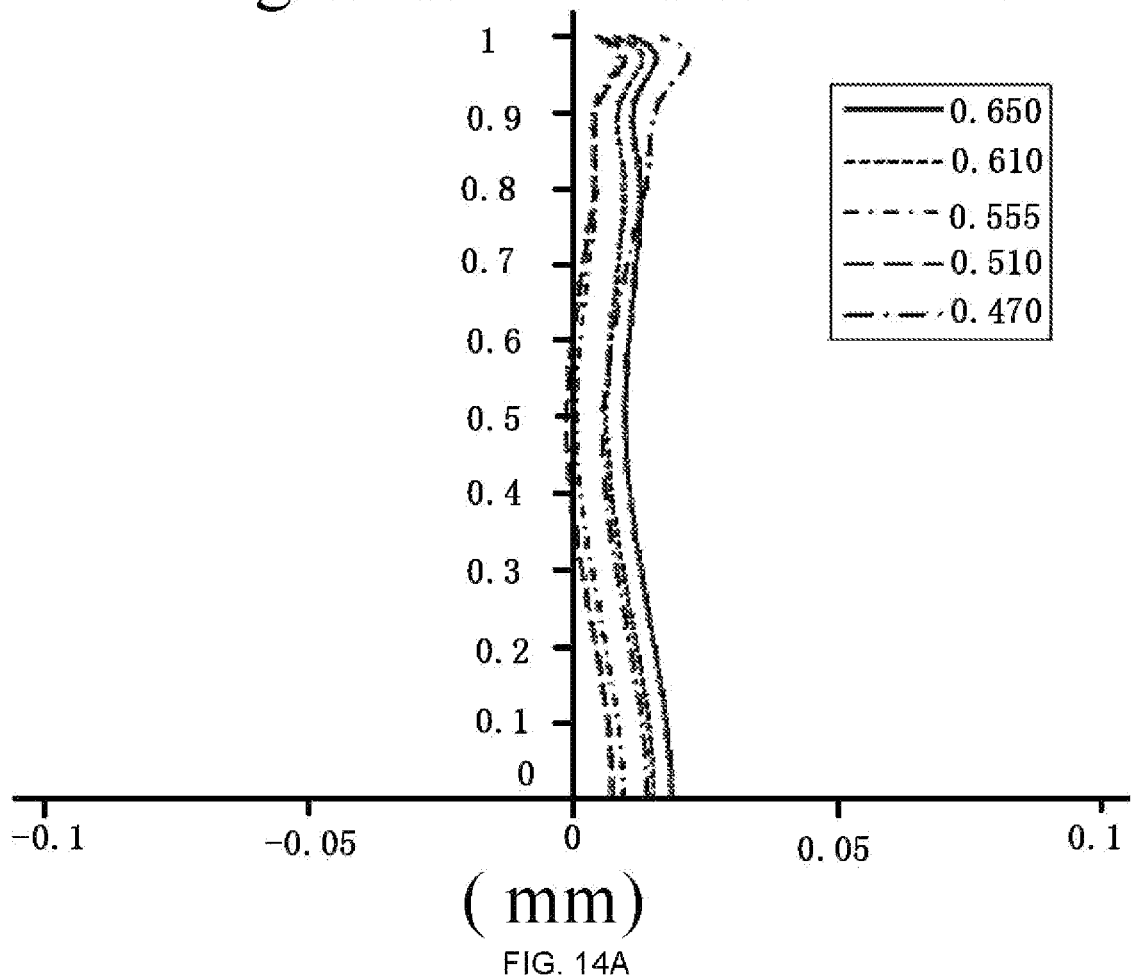
FIGS. 14A to 14D show a longitudinal aberration curve, an astigmatism curve, a distortion curve, and a lateral color curve, respectively, of the optical imaging lens of Embodiment 7.
Figure 14B:
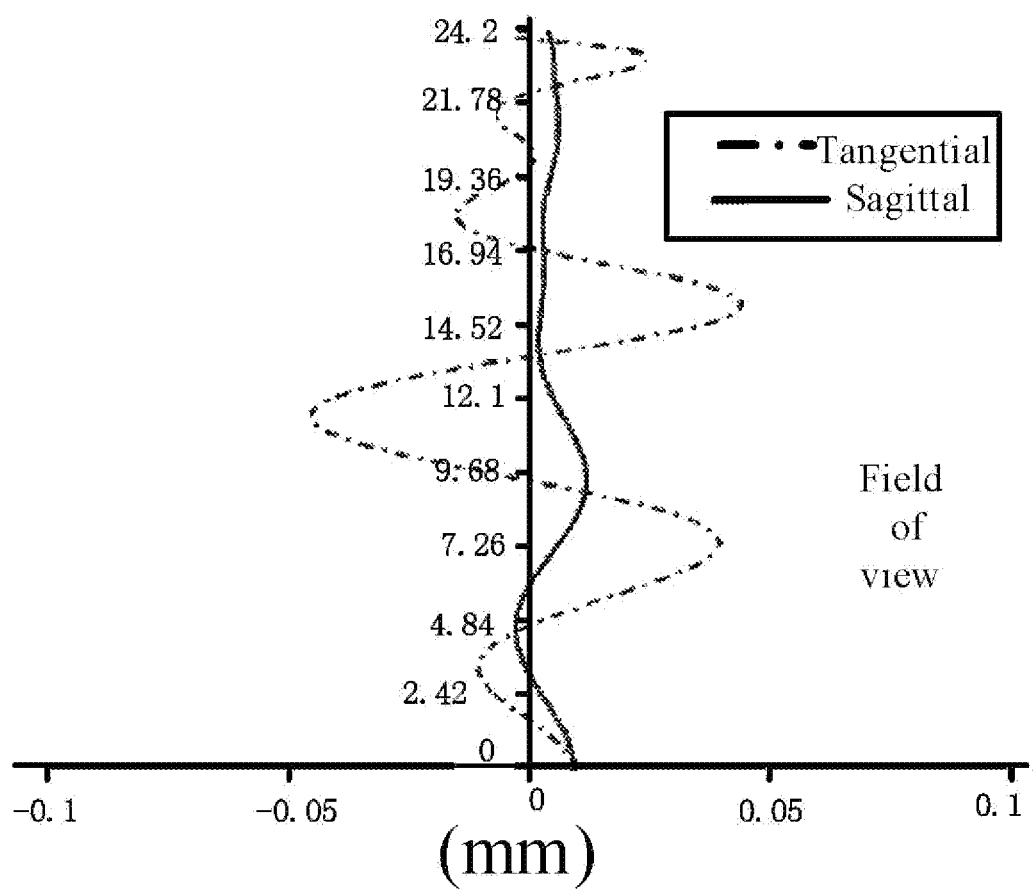
Figure 14:
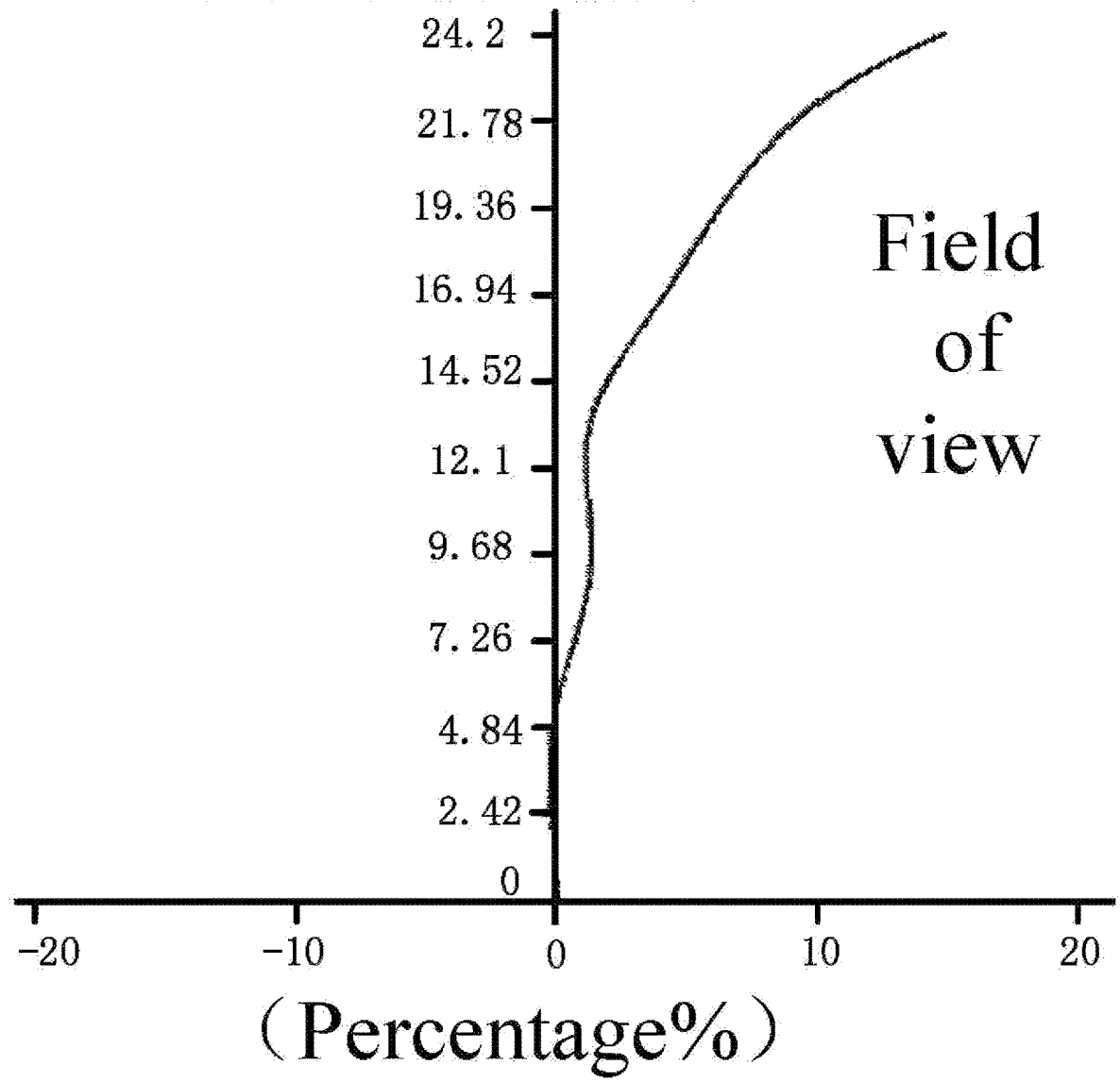
Figure 14D:
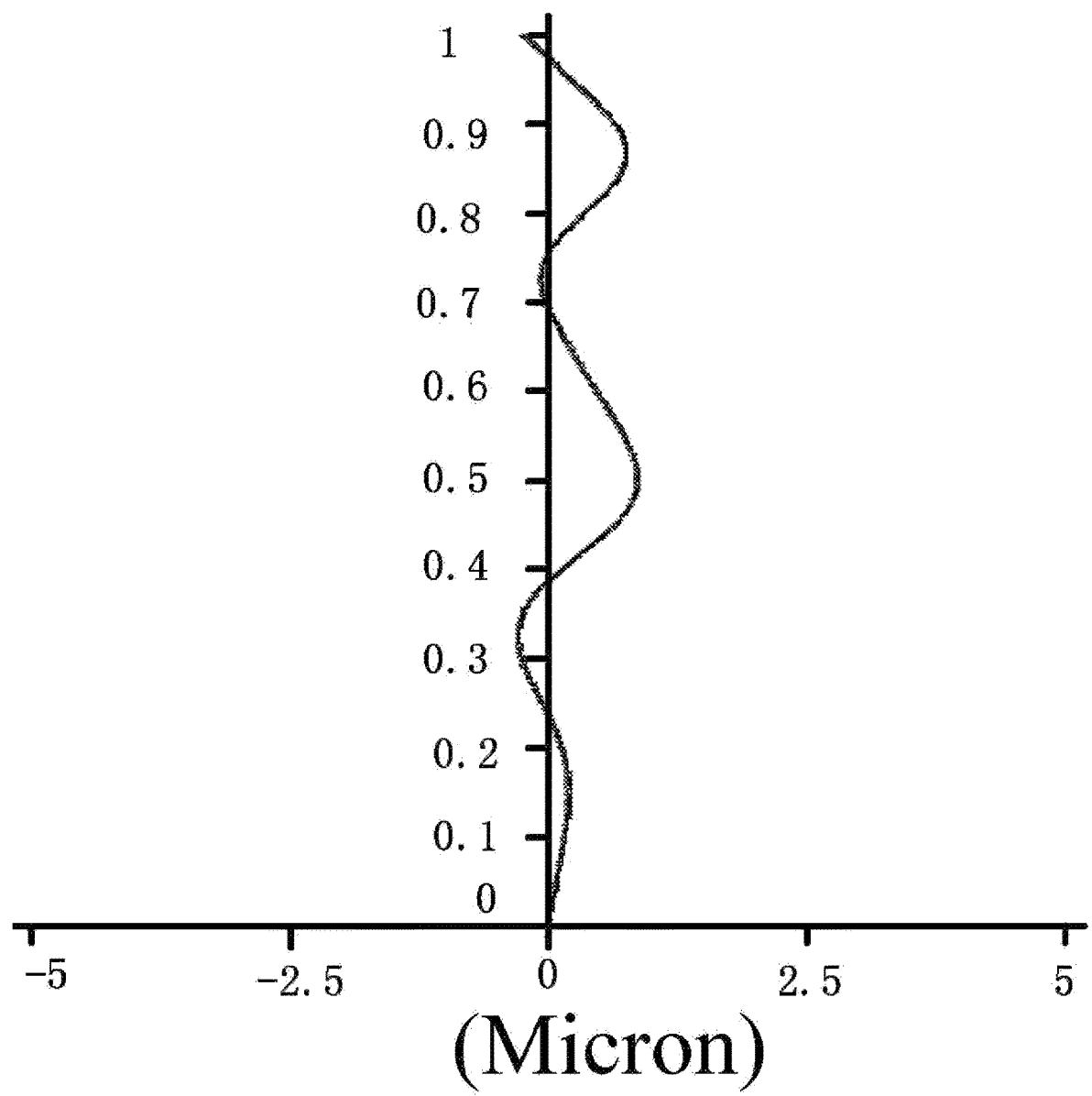

FIG. 14A shows a longitudinal aberration curve of the optical imaging lens of Embodiment 7, which indicates the deviations of light of different wavelengths from a convergent focus point after passing through the lens. FIG. 14B shows an astigmatic curve of the optical imaging lens of Embodiment 7, which indicates a tangential image plane curvature and an sagittal image plane curvature. FIG. 14C shows a distortion curve of the optical imaging lens of Embodiment 7, which indicates a distortion value under different viewing angles. FIG. 14D shows the lateral color curve of the optical imaging lens of Embodiment 7, which indicates the deviation of different image heights on the imaging surface of light passing through the lens. It can be seen from FIGS. 14A to 14D that, the optical imaging lens provided in Embodiment 7 can achieve good imaging quality.

In summary, Embodiments 1 to 7 satisfy the relationships shown in Table 15, respectively.

TABLE 15

| | embodiment | | | | | | |
|---|---|---|---|---|---|---|---|
| Condition Equation | 1 | 2 | 3 | 4 | 5 | 6 | 7 |
| TTL/f | 0.91 | 0.94 | 0.98 | 0.97 | 0.98 | 0.92 | 0.98 |
| (R5 + R6)/ (10 × CT3) | 2.58 | 2.43 | 1.70 | 1.68 | 2.20 | 2.34 | 2.15 |

TABLE 15-continued

| Condition Equation | embodiment | | | | | | |
|---|---|---|---|---|---|---|---|
| | 1 | 2 | 3 | 4 | 5 | 6 | 7 |
| f1/(f5 − f2) | 1.48 | 1.33 | 2.05 | 1.65 | 1.28 | 2.29 | 1.70 |
| R6/R5 | 1.13 | 1.40 | 1.26 | 0.63 | 0.42 | 1.13 | 1.10 |
| R8/R7 | 0.68 | 0.62 | 0.79 | 0.97 | 1.12 | 0.71 | 0.77 |
| f5/(R9 + R10) | −0.69 | −0.82 | −0.61 | −0.97 | −0.80 | −0.93 | −0.28 |
| (T23 + T34)/(T45 + T56) | 0.97 | 1.02 | 1.32 | 0.89 | 0.82 | 1.02 | 1.31 |
| DT62/(DT31 + DT32) | 1.15 | 1.04 | 0.90 | 1.14 | 1.16 | 1.06 | 0.99 |
| f12/f56 | −0.82 | −0.92 | −0.74 | −0.64 | −0.66 | −0.84 | −0.66 |
| SAG51/SAG41 | 2.46 | 2.27 | 2.35 | 2.33 | 2.86 | 2.68 | 2.42 |
| ET2/CT2 | 1.49 | 1.53 | 0.99 | 1.55 | 1.62 | 1.69 | 1.56 |
| ET5/CT6 | 0.53 | 0.73 | 1.04 | 0.69 | 0.81 | 0.71 | 1.11 |

The disclosure also provides an imaging device provided with an electronic photosensitive element for imaging, wherein the electronic photosensitive element can be a Charge Coupled Device (COD) or a Complementary Metal Oxide Semiconductor (CMOS). The imaging device may be a stand-alone imaging device, such as a digital camera, or an imaging module integrated on a mobile electronic equipment, such as a cell phone. The imaging device is equipped with the optical imaging lens described above.

The foregoing description is only a preferred embodiment of the disclosure and is illustrative of the technical principles employed. It should be understood by a person skilled in the art that the scope of protection referred to in this disclosure is not limited to the specific combination of the above-mentioned features, but also covers other features formed by any combination of the above-mentioned features or their equivalents without departing from the spirit of the invention. For Embodiment, the above-mentioned features and technical features disclosed in the disclosure (but not limited to) having similar functions are mutually replaced to form a technical solution.

What is claimed is:

1. An optical imaging lens, comprising sequentially from an object side to an image side along an optical axis:
   a first lens with a positive refractive power;
   a second lens with a negative refractive power;
   a third lens with a refractive power, an object side surface of the third lens being a convex surface, an image side surface of the third lens being a concave surface;
   a fourth lens with a refractive power, an object side surface of the fourth lens being a convex surface, an image side surface of the fourth lens being a concave surface;
   a fifth lens with a negative refractive power, an object side surface of the fifth lens being a convex surface, an image side surface of the fifth lens being a concave surface;
   a sixth lens with a refractive power; wherein
   a distance on the optical axis between the object side surface of the first lens to an imaging surface of an optical imaging lens is a Total Track Length (TTL), the TTL and a total effective focal length f of the optical imaging lens satisfy: TTL/f<1.0;
   a radius of curvature R5 of the object side surface of the third lens, the radius of curvature R6 of the image side surface of the third lens and a center thickness CT3 of the third lens on the optical axis satisfy 1.5<(R5+R6)/(10×CT3)<5.5.

2. The optical imaging lens as claimed in claim 1, wherein an effective focal length f1 of the first lens, an effective focal length f5 of the fifth lens, and an effective focal length f2 of the second lens satisfy: 1.2<f1/(f5−f2)<2.3.

3. The optical imaging lens as claimed in claim 1, wherein the radius of curvature R6 of the image side surface of the third lens and the radius of curvature R5 of the object side surface of the third lens satisfy: 0.4<R6/R5<1.5.

4. The optical imaging lens as claimed in claim 1, wherein a radius of curvature R8 of the image side surface of the fourth lens and a radius of curvature R7 of the object side surface of the fourth lens satisfy: 0.6<R8/R7<1.2.

5. The optical imaging lens as claimed in claim 1, wherein an effective focal length f5 of the fifth lens, a radius of curvature R9 of the object side surface of the fifth lens, and a radius of curvature R10 of the image side surface of the fifth lens satisfy: −1.0<f5/(R9+R10)<−0.2.

6. The optical imaging lens as claimed in claim 1, wherein a spacing distance T23 on the optical axis between the second lens and the third lens, and a spacing distance T34 on the optical axis between the third lens and the fourth tens, a spacing distance T45 on the optical axis between the fourth lens and the fifth lens and a spacing distance T56 on the optical axis between the fifth lens and the sixth lens satisfy: 0.8<(T23+T34)/(T45+T56)<1.4.

7. The optical imaging lens as claimed in claim 1, wherein an effective half-aperture DT62 of an image side surface of the sixth lens, an effective half-aperture DT31 of the object side surface of the third lens, and an effective half-aperture DT32 of the image side surface of the third lens satisfy: 0.8<DT62/(DT31+DT32)<1.2.

8. The optical imaging lens as claimed in claim 1, wherein a combined focal length f12 of the first lens and the second lens and a combined focal length f56 of the fifth lens and the sixth lens satisfy: −1.0<f12/f56<−0.6.

9. The optical imaging lens as claimed in claim 1, wherein a SAG51 and SAG41 satisfy: 2.2<SAG51/SAG41<2.9, the SAG51 is an on-axis distance from an intersection point of the object side surface of the fifth lens and the optical axis to an effective radius vertex of the object side surface of the fifth lens, the SAG41 is an on-axis distance from an intersection point of the object side surface of the fourth lens and the optical axis to an effective radius vertex of the object side surface of the fourth lens.

10. The optical imaging lens as claimed in claim 1, wherein an edge thickness ET2 of the second lens and a center thickness CT2 of the second lens on the optical axis satisfy: 0.9<ET2/CT2<1.7.

11. The optical imaging lens as claimed in claim 1, wherein an edge thickness ET5 of fifth lens and a center thickness CT6 of the sixth lens on the optical axis satisfy: 0.5<ET5/CT6<1.2.

12. An optical imaging lens, comprising sequentially from an object side to an image side along an optical axis:
- a first lens with a positive refractive power;
- a second lens with a negative refractive power;
- a third lens with a refractive power, an object side surface of the third lens being a convex surface, an image side surface of the third lens being a concave surface;
- a fourth lens with a refractive power, an object side surface of the fourth lens being a convex surface, an image side surface of the fourth lens being a concave surface;
- a fifth lens with a negative refractive power, an object side surface of the fifth lens being a convex surface, an image side surface of the fifth lens being a concave surface;
- a sixth lens with a refractive power; wherein
- a distance on the optical axis between the object side surface of the first lens to an imaging surface of an optical imaging lens is a Total Track Length (TTL), the TTL and a total effective focal length f of the optical imaging lens satisfy: TTL/f<0.0;
- a combined focal length f12 of the first lens and the second lens and a combined focal length f56 of the fifth lens and the sixth lens satisfy: −1.0<f12/f56<−0.6.

13. The optical imaging lens as claimed in claim 12, wherein an effective focal length f1 of the first lens, an effective focal length f5 of the fifth lens, and an effective focal length f2 of the second lens satisfy: 1.2<f1/(f5−f2)<2.3.

14. The optical imaging lens as claimed in claim 12, wherein a radius of curvature R6 of the image side surface of the third lens and a radius of curvature R5 of the object side surface of the third lens satisfy: 0.4<R6/R5<1.5.

15. The optical imaging lens as claimed in claim 12, wherein a radius of curvature R8 of the image side surface of the fourth lens and a radius of curvature R7 of the object side surface of the fourth lens satisfy: 0.6<R8/R7<1.2.

16. The optical imaging lens as claimed in claim 12, wherein an effective focal length f5 of the fifth lens, a radius of curvature R9 of the object side surface of the fifth lens, and a radius of curvature R10 of the image side surface of the fifth lens satisfy: −1.0<f5/(R9+R10)<−0.2.

17. The optical imaging lens as claimed in claim 12, wherein a spacing distance T23 on the optical axis between the second lens and the third lens, and a spacing distance T34 on the optical axis between the third lens and the fourth lens, a spacing distance T45 on the optical axis between the fourth lens and the fifth lens and a spacing distance T56 on the optical axis between the fifth lens and the sixth lens satisfy: 0.8<(T23+T34)/(T45+T56)<1.4.

18. The optical imaging lens as claimed in claim 17, wherein a radius of curvature R5 of the object side surface of the third lens, the radius of curvature R6 of the image side surface of the third lens and a center thickness CT3 of the third lens on the optical axis satisfy: 1.5<(R5+R6)/(10×CT3)<5.5.

19. The optical imaging lens as claimed in claim 12, wherein an effective half-aperture DT62 of an image side surface of the sixth lens, an effective half-aperture DT31 of the object side surface of the third lens, and an effective half-aperture DT32 of the image side surface of the third lens satisfy: 0.8<DT62/(DT31+DT32)<1.2.

20. The optical imaging lens as claimed in claim 12, wherein SAG51 and SAG41 satisfy: 2.2<SAG51/SAG41<2.9, the SAG51 is an on-axis distance from an intersection point of the object side surface of the fifth lens and the optical axis to an effective radius vertex of the object side surface of the fifth lens, the SAG41 is an on-axis distance from an intersection point of the object side surface of the fourth lens and the optical axis to an effective radius vertex of the object side surface of the fourth lens,
- preferably, wherein an edge thickness ET2 of the second lens and a center thickness CT2 of the second lens on the optical axis satisfy: 0.9<ET2/CT2<1.7,
- preferably, wherein an edge thickness ET5 of the fifth lens and a center thickness CT6 of the sixth lens on the optical axis satisfy: 0.5<ET5/CT6<1.2.

* * * * *